(12) United States Patent
Papakostas

(10) Patent No.: US 9,301,173 B2
(45) Date of Patent: Mar. 29, 2016

(54) METHODS AND APPARATUS TO CREDIT INTERNET USAGE

(71) Applicant: Achilleas Papakostas, Dallas, TX (US)

(72) Inventor: Achilleas Papakostas, Dallas, TX (US)

(73) Assignee: The Nielsen Company (US), LLC, New York, NY (US)

( * ) Notice: Subject to any disclaimer, the term of this patent is extended or adjusted under 35 U.S.C. 154(b) by 4 days.

(21) Appl. No.: 13/840,594

(22) Filed: Mar. 15, 2013

(65) Prior Publication Data

US 2014/0273923 A1    Sep. 18, 2014

(51) Int. Cl.
| | |
|---|---|
| *H04M 11/00* | (2006.01) |
| *H04W 24/08* | (2009.01) |
| *H04W 4/20* | (2009.01) |
| *H04L 29/08* | (2006.01) |
| *H04W 4/24* | (2009.01) |
| *H04W 4/26* | (2009.01) |
| *H04W 88/18* | (2009.01) |
| *H04M 15/00* | (2006.01) |

(52) U.S. Cl.
CPC ............... *H04W 24/08* (2013.01); *H04L 67/22* (2013.01); *H04L 67/2819* (2013.01); *H04W 4/206* (2013.01); *H04M 15/58* (2013.01); *H04M 15/8083* (2013.01); *H04W 4/24* (2013.01); *H04W 4/26* (2013.01); *H04W 88/182* (2013.01)

(58) Field of Classification Search
CPC ......... H04W 4/001; H04W 4/18; H04W 4/24; H04W 8/18; H04W 28/02; H04W 88/184; H04W 4/26
USPC ............... 455/403, 405, 406, 408, 411, 414.1
See application file for complete search history.

(56) References Cited

U.S. PATENT DOCUMENTS

| | | | |
|---|---|---|---|
| 4,355,372 A | 10/1982 | Johnson et al. |
| RE31,951 E | 7/1985 | Johnson et al. |
| 4,603,232 A | 7/1986 | Kurland et al. |
| 4,954,699 A | 9/1990 | Coffey et al. |
| 4,958,284 A | 9/1990 | Bishop et al. |
| 5,023,929 A | 6/1991 | Call |
| 5,060,140 A | 10/1991 | Brown et al. |
| 5,481,294 A | 1/1996 | Thomas et al. |
| 5,488,408 A | 1/1996 | Maduzia et al. |
| 5,497,185 A | 3/1996 | Dufresne et al. |

(Continued)

FOREIGN PATENT DOCUMENTS

| | | |
|---|---|---|
| CA | 2781018 | 12/2012 |
| CN | 10909739 | 2/2007 |

(Continued)

OTHER PUBLICATIONS

"HTTP Proxy Authentication and iPhone Apps", XP55009373, https://discussions.apple.com/message/8018666#8018666, Jan. 15, 2009, (4 pages).

(Continued)

*Primary Examiner* — Jean Gelin
(74) *Attorney, Agent, or Firm* — Hanley, Flight & Zimmerman, LLC

(57) ABSTRACT

Methods, apparatus, systems and articles of manufacture to monitor mobile internet usage are disclosed. An example method includes identifying an application associated with a first request received at a proxy. The application is credited with a presentation duration based on a time difference between the first request and a second request, the second request associated with a same application as the first request.

40 Claims, 16 Drawing Sheets

(56) References Cited

U.S. PATENT DOCUMENTS

| | | | |
|---|---|---|---|
| 5,526,427 A | 6/1996 | Thomas et al. | |
| 5,550,928 A | 8/1996 | Lu et al. | |
| 5,557,686 A | 9/1996 | Brown et al. | |
| 5,584,050 A | 12/1996 | Lyons | |
| 5,594,934 A | 1/1997 | Lu et al. | |
| 5,659,469 A | 8/1997 | Deaton et al. | |
| 5,675,510 A | 10/1997 | Coffey et al. | |
| 5,689,799 A | 11/1997 | Dougherty et al. | |
| 5,710,887 A | 1/1998 | Chelliah et al. | |
| 5,715,399 A | 2/1998 | Bezos | |
| 5,732,218 A | 3/1998 | Bland et al. | |
| 5,737,025 A | 4/1998 | Dougherty et al. | |
| 5,737,026 A | 4/1998 | Lu et al. | |
| 5,751,450 A | 5/1998 | Robinson | |
| 5,771,307 A | 6/1998 | Lu et al. | |
| 5,781,913 A | 7/1998 | Felsenstein et al. | |
| 5,790,875 A | 8/1998 | Andersin et al. | |
| 5,848,396 A | 12/1998 | Gerace | |
| 5,850,249 A | 12/1998 | Massetti et al. | |
| 5,862,325 A | 1/1999 | Reed et al. | |
| 5,872,850 A | 2/1999 | Klein et al. | |
| 5,887,140 A | 3/1999 | Itsumi et al. | |
| 5,889,548 A | 3/1999 | Chan | |
| 5,961,593 A | 10/1999 | Gabber et al. | |
| 5,970,469 A | 10/1999 | Scroggie et al. | |
| 5,991,735 A | 11/1999 | Gerace | |
| 6,006,260 A | 12/1999 | Barrick, Jr. et al. | |
| 6,026,367 A | 2/2000 | Hjelmvik | |
| 6,026,368 A | 2/2000 | Brown et al. | |
| 6,052,730 A | 4/2000 | Felciano et al. | |
| 6,055,573 A | 4/2000 | Gardenswartz et al. | |
| 6,058,381 A | 5/2000 | Nelson | |
| 6,070,145 A | 5/2000 | Pinsley et al. | |
| 6,070,148 A | 5/2000 | Mori et al. | |
| 6,081,900 A | 6/2000 | Subramaniam et al. | |
| 6,115,680 A | 9/2000 | Coffee et al. | |
| 6,128,624 A | 10/2000 | Papierniak et al. | |
| 6,138,162 A | 10/2000 | Pistriotto et al. | |
| 6,138,165 A | 10/2000 | Nakatsugawa | |
| 6,141,686 A | 10/2000 | Jackowski et al. | |
| 6,151,593 A | 11/2000 | Cho et al. | |
| 6,286,043 B1 | 9/2001 | Cuomo et al. | |
| 6,286,046 B1 | 9/2001 | Bryant | |
| 6,321,336 B1 | 11/2001 | Applegate et al. | |
| 6,351,467 B1 | 2/2002 | Dillon | |
| 6,381,632 B1 | 4/2002 | Lowell | |
| 6,421,733 B1 | 7/2002 | Tso et al. | |
| 6,449,251 B1 | 9/2002 | Awadallah et al. | |
| 6,487,538 B1 | 11/2002 | Gupta et al. | |
| 6,507,589 B1 | 1/2003 | Ramasubramani et al. | |
| 6,567,857 B1 | 5/2003 | Gupta et al. | |
| 6,606,581 B1 | 8/2003 | Nickerson et al. | |
| 6,658,414 B2 | 12/2003 | Bryan et al. | |
| 6,704,787 B1 | 3/2004 | Umbreit | |
| 6,839,680 B1 | 1/2005 | Liu et al. | |
| 6,856,963 B1 | 2/2005 | Hurwitz | |
| 6,993,590 B1 | 1/2006 | Gauthier et al. | |
| 7,003,555 B1 | 2/2006 | Jungck | |
| 7,039,599 B2 | 5/2006 | Merriman et al. | |
| 7,080,077 B2 | 7/2006 | Ramamurthy et al. | |
| 7,092,926 B2 | 8/2006 | Cerrato | |
| 7,092,942 B2 | 8/2006 | Frieden et al. | |
| 7,159,023 B2 | 1/2007 | Tufts | |
| 7,181,412 B1 | 2/2007 | Fulgoni et al. | |
| 7,200,632 B1 | 4/2007 | Greschler et al. | |
| 7,216,149 B1 | 5/2007 | Briscoe et al. | |
| 7,260,837 B2 | 8/2007 | Abraham et al. | |
| 7,366,724 B2 | 4/2008 | Frieden et al. | |
| 7,375,641 B2 | 5/2008 | Kiel et al. | |
| 7,376,722 B1 | 5/2008 | Sim et al. | |
| 7,584,423 B2 * | 9/2009 | Rohrabaugh et al. | 715/238 |
| 7,613,809 B2 | 11/2009 | Jackson et al. | |
| 7,688,813 B2 | 3/2010 | Shin et al. | |
| 7,695,879 B2 | 4/2010 | Vanbesien et al. | |
| 7,814,483 B2 | 10/2010 | Li et al. | |
| 7,849,502 B1 | 12/2010 | Bloch | |
| 8,086,219 B2 * | 12/2011 | O'Neil et al. | 455/408 |
| 2001/0014915 A1 | 8/2001 | Blumenau | |
| 2001/0020242 A1 | 9/2001 | Gupta et al. | |
| 2002/0069368 A1 | 6/2002 | Hines | |
| 2002/0077903 A1 | 6/2002 | Feldman et al. | |
| 2002/0116523 A1 | 8/2002 | Warrier et al. | |
| 2002/0128803 A1 | 9/2002 | Skinner et al. | |
| 2002/0144156 A1 | 10/2002 | Copeland, III | |
| 2002/0169830 A1 | 11/2002 | Mild et al. | |
| 2002/0178257 A1 | 11/2002 | Cerrato | |
| 2003/0009762 A1 | 1/2003 | Hooper et al. | |
| 2003/0018778 A1 | 1/2003 | Martin et al. | |
| 2003/0033432 A1 | 2/2003 | Simpson et al. | |
| 2003/0035409 A1 | 2/2003 | Wang et al. | |
| 2003/0051052 A1 | 3/2003 | Shteyn et al. | |
| 2003/0065595 A1 | 4/2003 | Anglum | |
| 2003/0076305 A1 | 4/2003 | Allen | |
| 2003/0091025 A1 | 5/2003 | Celi, Jr. et al. | |
| 2003/0154306 A1 | 8/2003 | Perry | |
| 2003/0195884 A1 | 10/2003 | Boyd et al. | |
| 2004/0133687 A1 | 7/2004 | Yamaguchi et al. | |
| 2004/0205159 A1 | 10/2004 | Johnson et al. | |
| 2005/0021603 A1 | 1/2005 | Yokomitsu et al. | |
| 2005/0108539 A1 | 5/2005 | Skog et al. | |
| 2005/0138192 A1 | 6/2005 | Encarnacion et al. | |
| 2005/0198261 A1 | 9/2005 | Durvasula et al. | |
| 2005/0201357 A1 | 9/2005 | Poyhonen | |
| 2006/0258341 A1 * | 11/2006 | Miller et al. | 455/414.1 |
| 2006/0264202 A1 | 11/2006 | Hagmeier et al. | |
| 2007/0123760 A1 | 5/2007 | Scholler et al. | |
| 2007/0214501 A1 | 9/2007 | Muramoto et al. | |
| 2007/0222598 A1 | 9/2007 | Kiel et al. | |
| 2008/0005736 A1 | 1/2008 | Apacible et al. | |
| 2008/0056261 A1 | 3/2008 | Osborn et al. | |
| 2008/0289010 A1 | 11/2008 | Frieden et al. | |
| 2009/0034536 A1 | 2/2009 | Morand | |
| 2009/0233633 A1 | 9/2009 | Morrison | |
| 2009/0282471 A1 | 11/2009 | Green et al. | |
| 2009/0296917 A1 | 12/2009 | Nogawa | |
| 2009/0320123 A1 * | 12/2009 | Yu et al. | 726/16 |
| 2010/0095215 A1 * | 4/2010 | Elven | 715/736 |
| 2010/0205617 A1 | 8/2010 | Hogan et al. | |
| 2010/0216434 A1 | 8/2010 | Marcellino | |
| 2010/0293610 A1 | 11/2010 | Beachem et al. | |
| 2012/0042005 A1 | 2/2012 | Papakostas et al. | |
| 2012/0042367 A1 | 2/2012 | Papakostas et al. | |
| 2012/0210321 A1 | 8/2012 | Silva et al. | |
| 2012/0216063 A1 | 8/2012 | Ogata | |
| 2012/0235930 A1 | 9/2012 | Lazaridis et al. | |
| 2012/0295581 A1 * | 11/2012 | Agarwal | 455/405 |
| 2013/0005296 A1 | 1/2013 | Papakostas et al. | |
| 2013/0006708 A1 * | 1/2013 | Lee | 705/7.29 |
| 2013/0031599 A1 | 1/2013 | Luna et al. | |
| 2013/0035059 A1 | 2/2013 | Liu et al. | |
| 2013/0064109 A1 * | 3/2013 | Combet et al. | 370/252 |
| 2013/0066875 A1 * | 3/2013 | Combet et al. | 707/740 |
| 2013/0281050 A1 * | 10/2013 | Agarwal et al. | 455/405 |
| 2014/0280896 A1 | 9/2014 | Papakostas et al. | |

FOREIGN PATENT DOCUMENTS

| | | |
|---|---|---|
| CN | 10159443 | 12/2009 |
| CN | 101605030 A | 12/2009 |
| CN | 102377616 | 3/2012 |
| CN | 102917003 | 2/2013 |
| EP | 1980950 | 10/2008 |
| EP | 2079256 | 7/2009 |
| EP | 2341437 | 7/2011 |
| EP | 2549713 | 1/2013 |
| JP | 2003219467 | 7/2003 |
| JP | 2004342080 | 12/2004 |
| JP | 2005115473 | 4/2005 |
| JP | 2007200209 | 8/2007 |
| JP | 2008511229 | 4/2008 |
| JP | 2009514050 | 4/2009 |
| JP | 2010079831 | 4/2010 |
| KR | 2005008068 | 10/2005 |
| WO | WO96/41495 | 12/1996 |

(56) References Cited

FOREIGN PATENT DOCUMENTS

| WO | WO98/31155 | 7/1998 |
| WO | WO0055783 | 9/2000 |
| WO | WO0111506 A1 | 2/2001 |
| WO | WO0144975 | 6/2001 |
| WO | WO0152462 | 7/2001 |
| WO | WO0250694 | 6/2002 |
| WO | WO03/067376 | 8/2003 |
| WO | WO2006044820 | 4/2006 |
| WO | WO2007123760 | 11/2007 |

OTHER PUBLICATIONS

Australian Patent Office, "Examination Report", issued in connection with Australian Application No. 2012203829, dated May 21, 2013 (3 pages).
Boyan, J. "The Anonymizer- Protecting User Provacy on the Web," Computer-Mediated Communication Magazine, 1997, XP002231197, http://www.december.com/cmc/mag/1997/sep/toc.html, 6 pages.
Canadian Intellectual Property Office, "Notice of Allowance", issued in connection with Canadian Patent Application No. 2,749,013, dated Nov. 4, 2014 (1 page).
Canadian Patent Office, "Office Action" issued in connection with Canadian Patent Application No. 2,748,997, dated Nov. 21, 2013 (2 pages).
Canadian Patent Office, "Office Action" issued in connection with Canadian Patent Application No. 2,749,013, dated Sep. 10, 2013 (2 pages).
Canadian Patent Office, "Office Action" issued in connection with Canadian Patent Application No. 2,781,018, dated Apr. 7, 2014 (3 pages).
Chinese Patent Office, "Notice of Allowance" in application No. 201110294045.0, dated Jul. 4, 2014 (5 pages, english translation included).
Chinese Patent Office, "Office Action" in application No. 201110294045.0, dated Apr. 3, 2014 (5 pages, english translation included).
Chinese Patent Office, "Office Action" in application No. 201110294045.0, dated Sep. 26, 2013 (26 pages, english translation included).
Chinese Patent Office, "Office Action" in application No. 201110305485.1, dated Sep. 22, 2013 (22 pages, english translation included).
Choo, C., et al. "A Behavioral Model of Information Seeking on the web—Preliminary Results of a Study of How Managers and IT Specialists Use the Web" Oct 1998 (16 pages).
Diffie W. et al., "Privacy and Authentication: an introduction to Cryptography" Proceedings of the IEEE, IEEE. New York, US, vol. 67, No. 3, Mar. 1979 (1979-03), pp. 397-426, SP000575227.
Dossick, S.E. et al., "WWW access to legacy clienUserver applications," Fifth International World Wide Web Conference, May 6-10, 1996, Paris, FR, http://iw3c2.cs.ust.hk/WWW5/www5corif inria.fr/fich_html'papers/P4/Overview.html, 12 pages.
European Patent Office, "Extended European Search Report and European Search Opinion", issued in connection with European Patent Application No. 11006705.May 2413, Oct. 14, 2011, (7 pages).
European Patent Office, "Extended European Search Report and European Search Opinion", issued in connection with European Patent Application No. 11006706.3-2413, Apr. 5, 2012, (15 pages).
European Patent Office, "Extended European Search Report and European Search Opinion", issued in connection with European Patent Application No. 12004911.9-2413, Dec. 13, 2012, (8 pages).
European Patent Office, "Extended European Search Report", issued in connection with EP patent application No. 12004911.9, mailed Apr. 3, 2013 (11 pages).
European Patent Office, Partial European Search Report, Issued in connection with Application No. 11006706.3-2413, Oct. 25, 2011, (7 pages).

IP Australia, "Notice of Acceptance", issued in connection with AU patent application 2012203829, issued Jun. 12, 2014, (2 pages).
IP Australia, "Notice of Acceptance", issued in connection with Australian Patent Application No. 2011211444, dated Apr. 29, 2014 (2 pages).
IP Australia, "Patent Examination Report No. 1", issued in connection with AU patent application 2011211443, issued Apr. 2, 2013, (3 pages).
IP Australia, "Patent Examination Report No. 1", issued in connection with AU patent application 2011211444, issued Apr. 2, 2013, (3 pages).
Japan Patent Office, "Notice of Reasons for Rejection", issued in connection with JP patent application No. P2012-145685, mailed May 7, 2013 (4 pages).
Japanese Patent Office, "Notice of Reasons for Rejection", issued in connection with Japanese Patent Application No. P2011-177687, dated Jun. 4, 2013 (7 pages).
Japanese Patent Office, "Notice of Reasons for Rejection", issued in Patent application No. P2011-177687, Dated Aug. 21, 2012 (3 pages).
Japanese Patent Office, "Notice of Reasons for Rejection", issued in Patent application No. P2011-177690, Dated Aug. 21, 2012 (4 pages).
Japanese Patent Office, "Notice of Reasons for Rejection", issued in Patent application No. P2011-177690, Dated Jun. 25, 2013 (4 pages).
Srivastava, J., et al. "Web Usage Mining: Discovery and Applications of Usage Patterns from Web Data" ACM SIGKDD Explorations Newsletter, vol. 1, Issue 2, pp. 12-33, Jan 2000.
The State Intellectual Property Office of China, "First Office Action", issued in connection with Chinese Patent Application No. 201210296506.2, dated Sep. 2, 2014 (21 pages).
United States Patent and Trademark Office, "Advisory Action", issued in connection with U.S. Appl. No. 12/856,651, Nov. 22, 2013, (2 pages).
United States Patent and Trademark Office, "Final Office Action", issued in connection with U.S. Appl. No. 12/856,651, Aug. 28, 2013, (16 pages).
United States Patent and Trademark Office, "Notice of Allowance", issued in connection with U.S. Appl. No. 12/856,643, Apr. 10, 2014, (14 pages).
United States Patent and Trademark Office, "Notice of Allowance", issued in connection with U.S. Appl. No. 12/856,643, Aug. 5, 2014, (5 pages).
United States Patent and Trademark Office, "Notice of Allowance", issued in connection with U.S. Appl. No. 12/856,651, Jul. 7, 2014, (11 pages).
United States Patent and Trademark Office, "Notice of Allowance", issued in connection with U.S. Appl. No. 13/174,517, Aug. 22, 2013, (19 pages).
United States Patent and Trademark Office, "Notice of Allowance", issued in connection with U.S. Appl. No. 13/174,517, Oct. 25, 2013, (2 pages).
United States Patent and Trademark Office, "Notice of Allowance", issued in connection with U.S. Appl. No. 13/174,517, Sep. 26, 2013, (2 pages).
United States Patent and Trademark Office, "Office Action", issued in connection with U.S. Appl. No. 12/856,643, Jun. 18, 2012, (8 pages).
United States Patent and Trademark Office, "Office Action", issued in connection with U.S. Appl. No. 12/856,643, May 9, 2013, (10 pages).
United States Patent and Trademark Office, "Office Action", issued in connection with U.S. Appl. No. 12/856,651, Mar. 27, 2012, (11 pages).
United States Patent and Trademark Office, "Office Action", issued in connection with U.S. Appl. No. 13/174,517, Aug. 15, 2012, (12 pages).
User Identification and Authentication Vital Security 9.2, XP55009307, http://www.m86security.com/software/secure_web_gateway/manuals.9.2.0/User_Identification_and_Authentication.pdf, Apr. 25, 2010, (27 pages).
Wavecrest Computing, Cyfin Proxy, User Manual for Version 8.2.x, pp. 1-140, Apr. 9, 2010 (147 pages).
Zenel, B., "A general Purpose Proxy Filtering Mechanism Applied to the Mobile Environment," Wireless Networks, ACM, US, vol. 15, No. 5, Oct. 1999, pp. 391-409, XP000902494.

(56) References Cited

OTHER PUBLICATIONS

United States Patent and Trademark Office, "Office Action", issued in connection with U.S. Appl. No. 13/840,543, May 21, 2015, (15 pages).

IP Australia, "Patent Examination Report No. 1," issued in connection with Application No. 2014210640, May 27, 2015, 4 pages.

Canadian Intellectual Property Office, "Notice of Allowance", issued in connection with Canadian Patent Application No. 2,748,997, Mar. 16, 2015, 1 page.

Patent Cooperation Treaty, "International Search Report and Written Opinion," issued in connection with Application No. PCT/US2014/028176, Sep. 1, 2014, 11 pages.

Canadian Intellectual Property Office, "Notice of Allowance", issued in connection with Canadian Patent Application No. 2,781,018, Apr. 16, 2015, 1 page.

State Intellectual Property Office of China, "Notice of Allowance," issued in connection with Application No. 201210296506.2, Mar. 18, 2015, (5 pages, English translation included).

* cited by examiner

400

| | 410 | 420 | 430 | 440 |
|---|---|---|---|---|
| | DEVICE IDENTIFIER | PANELIST IDENTIFIER | TIMESTAMP | HTTP REQUEST |
| 450 | Apple® iPhone® | 50000 | 6:00:00 PM | GET http://app.espn.com/home.html HTTP/1.1<br>Host: proxy.MonitoringEntity.com:50000<br>User-Agent: SportCenter<br>... |
| 460 | Apple® iPhone® | 50000 | 6:01:23 PM | GET http://app.espn.com/article1.html HTTP/1.1<br>Host: proxy.MonitoringEntity.com:50000<br>User-Agent: SportCenter<br>... |
| 470 | Apple® iPhone® | 50000 | 6:04:43 PM | GET http://mail.company.com/ HTTP/1.1<br>Host: proxy.MonitoringEntity.com:50000<br>User-Agent: iPhone Mail<br>... |
| 480 | Apple® iPhone® | 50000 | 6:15:39 PM | GET http://app.espn.com/article2.html.html HTTP/1.1<br>Host: proxy.MonitoringEntity.com:50000<br>User-Agent: SportCenter<br>... |
| 490 | Apple® iPhone® | 50000 | 6:17:42 PM | GET http://www.weather.com/home.html HTTP/1.1<br>Host: proxy.MonitoringEntity.com:50000<br>User-Agent: Apple® Safari®<br>... |

METHODS AND APPARATUS TO CREDIT INTERNET USAGE

FIELD OF THE DISCLOSURE

This disclosure relates generally to media monitoring, and, more particularly, to methods and apparatus to credit usage of mobile devices.

BACKGROUND

In recent years, methods of accessing Internet content have evolved. For example, Internet content was formerly primarily accessed via computer systems such as desktop and laptop computers. Recently, handheld mobile devices (e.g., smartphones) have been introduced that allow users to request and view Internet content.

BRIEF DESCRIPTION OF THE DRAWINGS

FIG. 4 is an example data table of HTTP requests stored in the data store by the proxy of FIG. 1.

The figures are not to scale. Wherever possible, the same reference numbers will be used throughout the drawing(s) and accompanying written description to refer to the same or like parts.

DETAILED DESCRIPTION

Monitoring companies desire to gain knowledge on how users interact with their handheld mobile devices such as smartphones. For example, monitoring companies want to monitor Internet traffic to and/or from the handheld mobile devices to, among other things, monitor exposure to advertisements, determine advertisement effectiveness, determine user behavior, identify purchasing behavior associated with various demographics, credit application usage, etc. Some known systems have utilized a proxy server to monitor Internet content being transmitted to and from the monitored device.

Proxy servers relay requests for media (e.g., images, video, webpages, etc.) from a requesting device to a server and, in turn, relay a response from the server to the requesting device. Mobile devices commonly include multiple communication options such as, for example, a Wi-Fi radio, a cellular radio, etc. In some examples, mobile devices can be configured to route requests for media to (and/or through) a proxy server.

In some examples, the communication options of the mobile device are configured separately for use with the proxy. For example, a Wi-Fi radio may be configured using a proxy auto configuration (PAC) file, while a cellular radio may be configured using a profile. Example systems, methods, and apparatus for configuring a mobile device to interact with a proxy are disclosed in U.S. patent application Ser. Nos. 12/856,651, 12/856,643, 13/174,517, each of which are hereby incorporated by reference in their entirety.

Example systems, methods, and apparatus disclosed herein illustrate how applications associated with hypertext transfer protocol (HTTP) messages received at a proxy are credited with durations of presentation. In some examples, browser traffic (e.g., traffic from a browser application such as, for example, Apple® Safari®) is analyzed to credit page views and/or presentation durations associated with page views. Some applications utilize protocols other than HTTP such as, for example, HTTP Secure (HTTPS). Accordingly, while the examples disclosed herein are described with reference to the HTTP protocol, any other past, present, and/or future protocol and/or format of communication may additionally or alternatively be used such as, for example, HTTP secure (HTTPS), File Transfer Protocol (FTP), etc.

Figure 1:
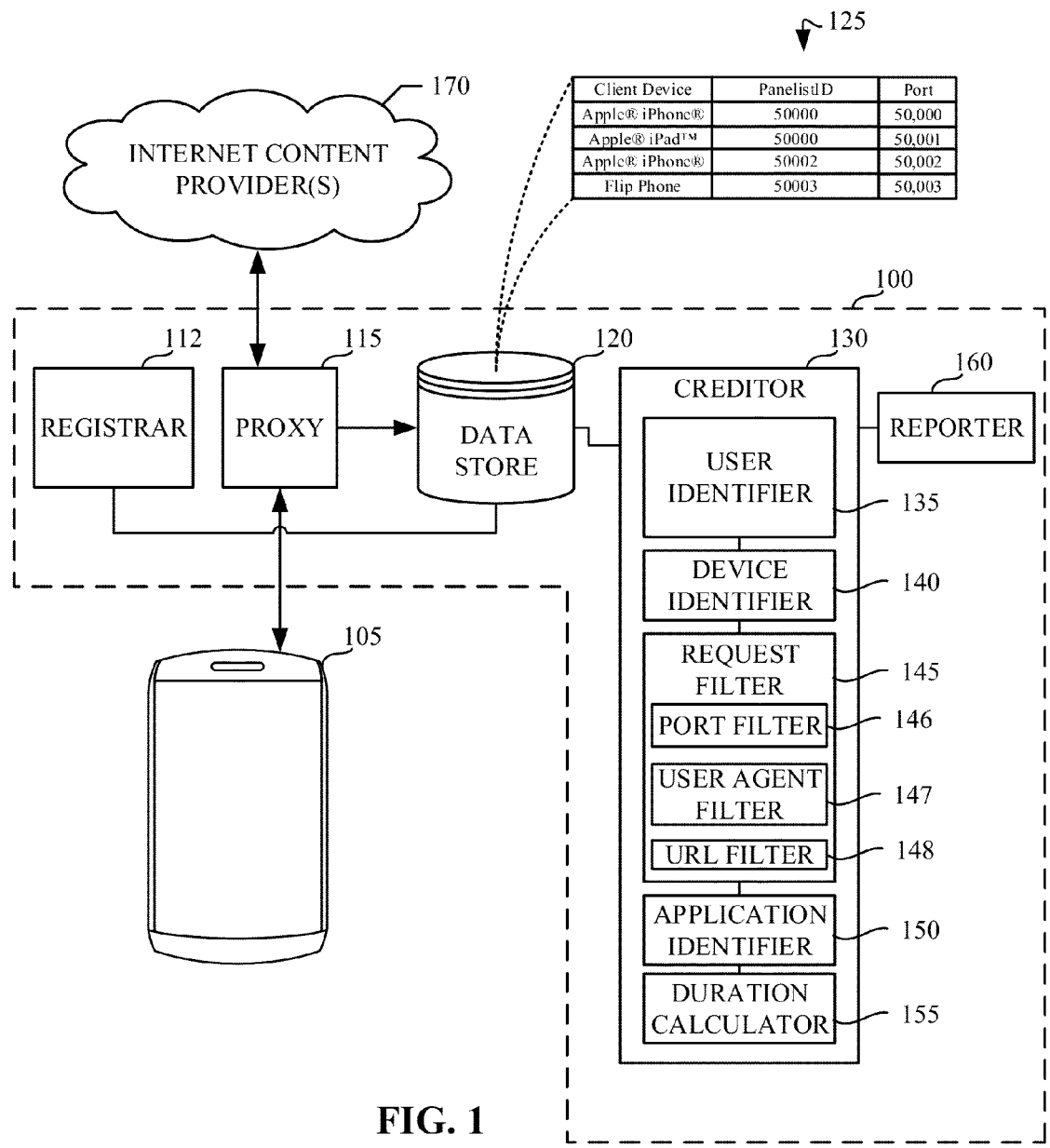
FIG. 1 is a block diagram of an example system constructed in accordance with the teachings of this disclosure to monitor Internet activity.

FIG. 1 is a block diagram of an example system 100 constructed in accordance with the teachings of this disclosure to monitor Internet activity. The example system 100 monitors Internet traffic to and/or from handheld mobile devices (e.g., a mobile device 105). The monitored Internet traffic between the monitored devices (e.g., the mobile device 105) and Internet sites (e.g., Internet content provider(s) 170) is routed to the example monitoring system 100. As shown in FIG. 1, the traffic passes through a proxy 115 of the example monitoring system 100. The example monitoring system 100 includes a registrar 112, the proxy 115, a data store 120, a creditor 130, a user identifier 135, a device identifier 140, a request filter 145, an application identifier 150, a duration calculator 155, and a reporter 160.

The example mobile device 105 of FIG. 1 is a handheld mobile device. While in the illustrated example the mobile device 105 is shown as a cellular phone, any other type of device may be used. For example, other types or phones (e.g., an Apple® iPhone®), a laptop computer, a desktop computer, a personal digital assistant (PDA), a netbook, or a tablet computer (e.g., an Apple® iPad™) may additionally or alternatively be used. The mobile device may be implemented with any mobile operating system, and may be implemented with any type of hardware and/or form factor. In the illustrated example, the mobile device communicates via a wireless interface. However, any other type(s) of communication interface may additionally or alternatively be used such as, for example, an Ethernet connection, a Bluetooth connection, a Wi-Fi connection, a cellular connection (e.g., a Time Division Multiple Access (TDMA) connection, Code Division Multiple Access (CDMA) connection, Worldwide Interoperability for Microwave Access (WiMAX) connection, Long Term Evolution (LTE) connection, etc.)

In the illustrated example, the mobile device 105 is associated with a panelist participating in a monitoring service. Although the example system of FIG. 1 is a panelist-based system, non-panelist and/or hybrid panelist systems may alternatively be employed. In the panelist system of the illustrated example, demographic information is obtained from the user when the user joins and/or registers for the panel. The demographic information may be obtained from the user via a telephone interview, by having the user complete an online survey, etc. Additionally or alternatively, panelists may be contacted and/or enlisted using any desired methodology (e.g., random selection, statistical selection, phone solicitations, Internet advertisements, surveys, advertisements in shopping malls, etc.).

In the illustrated example, a first panelist is associated with the mobile device 105. In the illustrated example, the mobile device 105 is owned, leased, or otherwise belongs to the first panelist. The monitoring entity of the illustrated example does not provide the mobile device to the first panelist. In other systems, panelists may be provided with mobile devices to participate in the panel. While in the illustrated example, the mobile device 105 is associated with a single panelist, the mobile device 105 may alternatively be associated with more than one panelist. For example, a family may have a single mobile device (e.g., a tablet computer) that may be shared amongst multiple users. The sharing of a client device is less common when the client device is a cellular phone than when the client device is a portable computer (e.g., an Apple® iPad™).

In the illustrated example, the example monitoring system 100 is shown as multiple computing systems. However, the monitoring system 100 may alternatively be comprised of a single computing system. In the illustrated example, the monitoring system 100 includes the example registrar 112, the example proxy 115, the example data store 120, the example creditor 130, and the example reporter 160. However, additional structures may be implemented to carry out one or more portions of the functionalities implemented by the example proxy 115, the example data store 120, the example creditor 130, the example reporter 160, and/or other structures associated with one or more additional and/or alternative functions.

The registrar 112 of FIG. 1 is implemented by a logic circuit such as a processor executing computer readable instructions, but it could additionally or alternatively be implemented by an Application Specific Integrated Circuit (ASIC(s)), a Programmable Logic Device (PLD(s)), a Field Programmable Logic Device (FPLD(s)), an analog circuit, and/or digital circuitry. In the example of FIG. 1, the registrar 112 receives registration information from the panelist and stores a record identifying the panelist and/or their respective client device 105. In the illustrated example, the record identifying the panelist is a port number assigned to the panelist (e.g., the port assigned to the panelist may be 50,000 and the record identifying the panelist may be 50,000). In the illustrated example, the received registration information includes demographic information. However, any other information may additionally or alternatively be collected. The registration information may include, for example, information identifying the model of the mobile device 105 associated with the panelist, a mailing address associated with the panelist, an email address associated with the panelist, a phone number associated with the mobile device 105, a unique identifier of the panelist and/or mobile device 105 (e.g., a social security number of the panelist, a phone number of the mobile device 105, a zip code of the panelist, and/or any combination or derivation of any information related to the panelist and/or mobile device 105), the age of the panelist, the gender of the panelist, the race of the panelist, the marital status of the panelist, the income of the panelist and/or the household of the panelist, the employment status of the panelist, where the panelist typically intend to use their device, how long the panelist has owned their device, the education level of the panelist and/or any other information related to the panelist and/or the mobile device 105.

In the illustrated example, the registration data is received by the registrar 112 via an electronic interface (e.g., by a panelist entering data into a form at a website or answering survey questions at a website). However, the registrar 112 may receive the registration data via any other means. For example, the registrar may receive the registration data via a personal interview (by telephone or in person), a telephone interface, direct mailing, purchased lists, etc. While the registrar 112 of the illustrated example is an electronic system, the registrar 112 may alternatively be implemented manually by a person or group of people collecting and entering the registration data into the data store 120.

Upon receiving the registration data, the registrar 112 of the illustrated example creates a record associating the panelist and device identifier information with the collected demographic information. The registrar 112 may also assign a unique alphanumeric identifier to the panelist or device. The identifier may be based on, for example, a serial number of the mobile device 105. The record is stored in the data store 120. In the illustrated example, the registrar 112 also assigns a unique port number to the panelist and/or the mobile device 105 and stores the port number in the record (or in association with the record for that panelist and/or mobile device). As noted above, in addition to assigning and storing the port number, the registrar may assign and store additional identifiers. For example, the registrar may assign and store an identifier of the client device and/or the panelist. The panelist or client device identifier(s) may be the same as the port number, or they may be different from the port number.

While in the illustrated example port numbers are used to identify the panelist and/or mobile device 105, any other way of identifying the panelist and/or mobile device may additionally or alternatively be used. For example, a username and/or password may be used to identify the panelist and/or mobile device 105.

The data store 120 may be any device for storing data such as, for example, flash memory, magnetic media, optical media, etc. Furthermore, the data stored in the data store 120 may be in any data format such as, for example, binary data, comma delimited data, tab delimited data, structured query language (SQL) structures, etc. While in the illustrated example the data store 120 is illustrated as a single database, the data store 120 may be implemented by multiple databases. The data store 120 receives and stores identifiers associating a panelist with the mobile device 105 from the registrar 112. Additionally, the data store 120 receives and stores monitoring data from the proxy 115. The monitoring data is associated with the corresponding panelist and/or client device via the port number used for the corresponding monitored Internet traffic. The data store 120 may also be capable of storing data that is not identifiers and/or measurement data. For example, software and/or firmware for any component of the monitoring system 100 may be stored in the data store 120. Additionally, the data store 120 may store demographic data as collected by the registrar 112.

The example proxy 115 of the illustrated example of FIG. 1 is implemented by a logic circuit such as a processor executing computer readable instructions, but it could additionally or alternatively be implemented by an ASIC, a PLD, an FPLD, an analog circuit, and/or digital circuitry. The proxy 115 of the illustrated example receives requests from the mobile device 105. The requests of the mobile device 105 are received by the proxy 115 based on configuration information (e.g., a server address, a port number, a username, a password, etc.) provided to the panelist and/or mobile device 105. The configuration information causes the mobile device 105 to transmit all subsequent requests through the proxy 115.

Upon receiving a request from the mobile device 105, the proxy 115 retrieves the requested Internet content from the Internet content providers 170 (or from a local cache if, for example, the content has previously been requested and stored). In order to identify the panelist associated with the request, communication to and from each specific panelist occurs over the uniquely assigned (e.g., dedicated) port. Thus, each panelist is assigned a unique port and no other panelist communicates via that port. In some examples, each panelist/device pair is assigned a unique port number to facilitate differentiation between usage of a first device (e.g., a phone) by a panelist and usage of a second device (e.g., an iPad) by the same panelist. While the communication between a mobile device 105 and the proxy 115 occurs over a single port, communication between the proxy 115 and the Internet content providers 170 may be implemented over any port. Typically, the port used by the proxy to communicate with content providers 170 is limited to hypertext transfer protocol (HTTP) data that occurs over port 80. After retrieving the requested Internet content from the Internet content provider(s) 170, in the illustrated example the content is relayed to the requesting mobile device 105 via the port assigned to the mobile device. Additionally or alternatively, the content may be relayed to the requesting mobile device 105 via a port other than the assigned port (e.g., port 80).

The proxy 115 of the illustrated example stores the requests for Internet content and/or portion(s) of such requests originating from the mobile device 105 in the data store 120 in association with the port numbers over which the request was received. Example data collected by the proxy 115 includes a username (e.g., proxy access credentials), an IP Address of the mobile device 115, a proxy port number for a request, a timestamp (e.g., a timestamp in a format such as: 2010-06-14 16:04:38-0400), a request method including a full requested URL and/or a query string, a status code of a response to the request, a size of a response to the request (e.g., a size of the payload, excluding headers), a User Agent, an X-DSID (e.g., a user id for iTunes or App Store on a iPhone), an X-Apple-Client-Application field value (e.g., "Software" for App-Store, "WiFi-Music" for iTunes), a referrer, a content type of a response to the request, a total size of a response to the request (e.g., a total size of the payload and HTTP headers), and/or time taken to serve the request (e.g., in microseconds). In storing the requests, the proxy 115 may additionally store other identifiers such as, for example, the identifier of the mobile device 105, and/or an identifier of the panelist. Additionally or alternatively, the proxy 115 may store a portion of the Internet content in the data store 120. For example, the proxy 115 may store the body of a webpage transmitted to the mobile device 105. In another example, the proxy 115 may store an identifier of an advertisement appearing on the webpage transmitted to the client. This is particularly useful in situations where advertisements are rotated at websites. Additionally or alternatively, the proxy 115 may store characteristics of the response, such as, for example the HTTP header, a status code of the HTTP header, a content type of the HTTP header, etc.

The Internet content providers 170 supply content to clients via the Internet. In the illustrated example, the proxy 115 acts as an intermediary for the mobile device 105, and, thus, is the client of the Internet content providers 170. Internet content is often supplied over port 80, as most Internet content is in the form of HTTP data. However, any other port may be used to supply Internet content. For example, file transfer protocol (FTP) data may be transmitted over port 21, HTTP over Secure Socket Layer (SSL) may be transmitted over port 443, etc.

The Internet content providers 170 can be implemented by any number and/or type of Internet provider. For example, the Internet content providers 170 may comprise a web server hosting webpages formatted as Hypertext Markup Language (HTML) content. Alternatively, the Internet content provider 170 may be an application server providing application content (e.g., media, audio, video, etc.) to applications accessing Internet content. The application content may be formatted as HTML, XML, or may use any other protocol or port to return content to the requester. In some examples, the application data is implemented in a protocol specifically targeted for an application (e.g., a weather application) requesting Internet content.

The example creditor 130 of the illustrated example of FIG. 1 credits application and/or browser usage to the panelist and/or mobile device based on the requests received by the proxy 115. In the illustrated example, the creditor 130 includes the example user identifier 135, the example device identifier 140, the example request filter 145, the example application identifier 150, and the example duration calculator 155.

The example user identifier 135 of the illustrated example of FIG. 1 is implemented by a logic circuit such as a processor executing computer readable instructions, but it could additionally or alternatively be implemented by an ASIC, a PLD, an FPLD, an analog circuit, and/or digital circuitry. The example user identifier 135 inspects HTTP requests (and/or records including HTTP requests) received by the proxy 115 to determine which user (e.g., panelist) transmitted the request. In the illustrated example, the example user identifier 135 identifies the panelist based on a port number via which the HTTP request is received. As shown in the example table 125 of FIG. 1, each panelist and device combination is associated with a unique port number. Accordingly, the panelist and device may be identified by the user identifier 135 based on the port number. However, any other approach to identifying a panelist may additionally or alternatively be used. For example, panelists may be identified based on user identifying information included in the received HTTP request (e.g., a username, a password, a cookie, etc.)

The example device identifier 140 of the illustrated example of FIG. 1 is implemented by a logic circuit such as a processor executing computer readable instructions, but it could additionally or alternatively be implemented by an ASIC, a PLD, an FPLD, an analog circuit, and/or digital circuitry. The example device identifier 140 identifies a device that transmitted an HTTP request by performing a lookup of registration data and/or device data received from the panelist that is associated with the port number of the received request. However, any other method of identifying the device associated with the received request may additionally or alternatively be used. For example, the device identifier 140 may inspect the data in the user agent field of the received request to identify a device from which it was transmitted. In some examples, a user agent field of the received request contains information about the operating system version and/or a hardware version of the device transmitting a request. In some examples, identifiers present in the user agent field (e.g., version numbers) may be used to look up a device model in a lookup table. In some examples, the device identifier 140 identifies capabilities and/or features of the mobile device based on the lookup. For example, the device identifier 140 may identify that the mobile device includes, for example, a cellular radio, a sixteen gigabyte memory device, etc.

The example request filter 145 of the illustrated example of FIG. 1 is implemented by a logic circuit such as a processor executing computer readable instructions, but it could additionally or alternatively be implemented by an ASIC, a PLD, an FPLD, an analog circuit, and/or digital circuitry. The example request filter 145 filters requests received by the proxy 115 and stored in the data store 120 based on one or more filters. The request filter 145 creates a filtered request log that is inspected by the example application identifier 150. In the illustrated example, the request filter 145 filters requests based on, for example, a port number of the received request, a user agent of the received request, a URL of the received request, a content type of the received request, an HTTP status message of the received request, an HTTP status code of a message returned to the proxy 115 by the Internet content providers 170, a parameter of an HTTP response received by the proxy 115 (e.g., a response to a request transmitted to the Internet content providers 170 on behalf of the mobile device 105), etc. In examples disclosed herein, the example request filter 145 filters requests and/or responses to remove records that are not related to crediting. For example, the example request filter 145 may remove records that contain invalid information, data errors (e.g., messages including an HTTP status code indicating that there was an error in serving the response), duplicate records, etc.

The example application identifier 150 of the illustrated example of FIG. 1 is implemented by a logic circuit such as a processor executing computer readable instructions, but it could additionally or alternatively be implemented by an ASIC, a PLD, an FPLD, an analog circuit, and/or digital circuitry. The example application identifier 150 identifies an application associated with the received request. In the illustrated example, the application identifier 150 identifies the application based on one or more of the user agent and/or the URL of the request. In some examples, the user agent may be generic and the URL may not identify a particular application. That is, the application may be difficult to identify. In such an example, the application identifier 150 may identify the application associated with the request based on other HTTP requests and/or records including HTTP requests that came from the same panelist/device and are within a threshold period of time of the difficult-to-identify HTTP request.

The example duration calculator 155 of the illustrated example of FIG. 1 is implemented by a logic circuit such as a processor executing computer readable instructions, but it could additionally or alternatively be implemented by an ASIC, a PLD, an FPLD, an analog circuit, and/or digital circuitry. The example duration calculator 155 identifies temporal differences between HTTP requests and, based on whether the requests are associated with the same application, identifies a duration of usage of the application.

The example reporter 160 of the illustrated example of FIG. 1 is implemented by a logic circuit such as a processor executing computer readable instructions, but it could additionally or alternatively be implemented by an ASIC, a PLD, an FPLD, an analog circuit, and/or digital circuitry. The reporter 160 generates reports indicative of application usage metrics based on one or more different types of mobile devices (e.g., personal computers, portable devices, mobile phones, tablets, etc.). For example, the reporter 160 compiles application usage metrics based on application crediting performed by the example duration calculator 155. A report is then generated to indicate application usage statistics. In some examples, the application usage measurements provide ratings information for different applications.

Additionally or alternatively, popularities of different applications across different device types may be reported. Such different types of applications may be, for example, news applications, media applications (e.g., a streaming media application, an internet radio application, etc.), games, streaming games, email applications, productivity application (e.g., note taking applications, dictation applications, etc.), etc. Such comparisons may be made across any type(s) and/or numbers of devices including, for example, cell phones, smart phones, dedicated portable multimedia playback devices, iPod® devices, tablet computing devices (e.g., an iPad®), Internet enabled televisions, stationary computers, portable computers, Internet radios, etc. Any other type(s) and/or number of applications and/or devices may be analyzed. The report may also associate the application usage metrics with demographic segments (e.g., age groups, genders, ethnicities, etc.) corresponding to the user(s) of the client device(s). Additionally or alternatively, the report may associate the application usage metrics with metric indicators of the popularity of the application and/or similar applications across one or more user characteristics selected from one or more demographic segment(s), one or more age group(s), one or more gender(s), and/or any other user characteristic(s).

Figure 2:
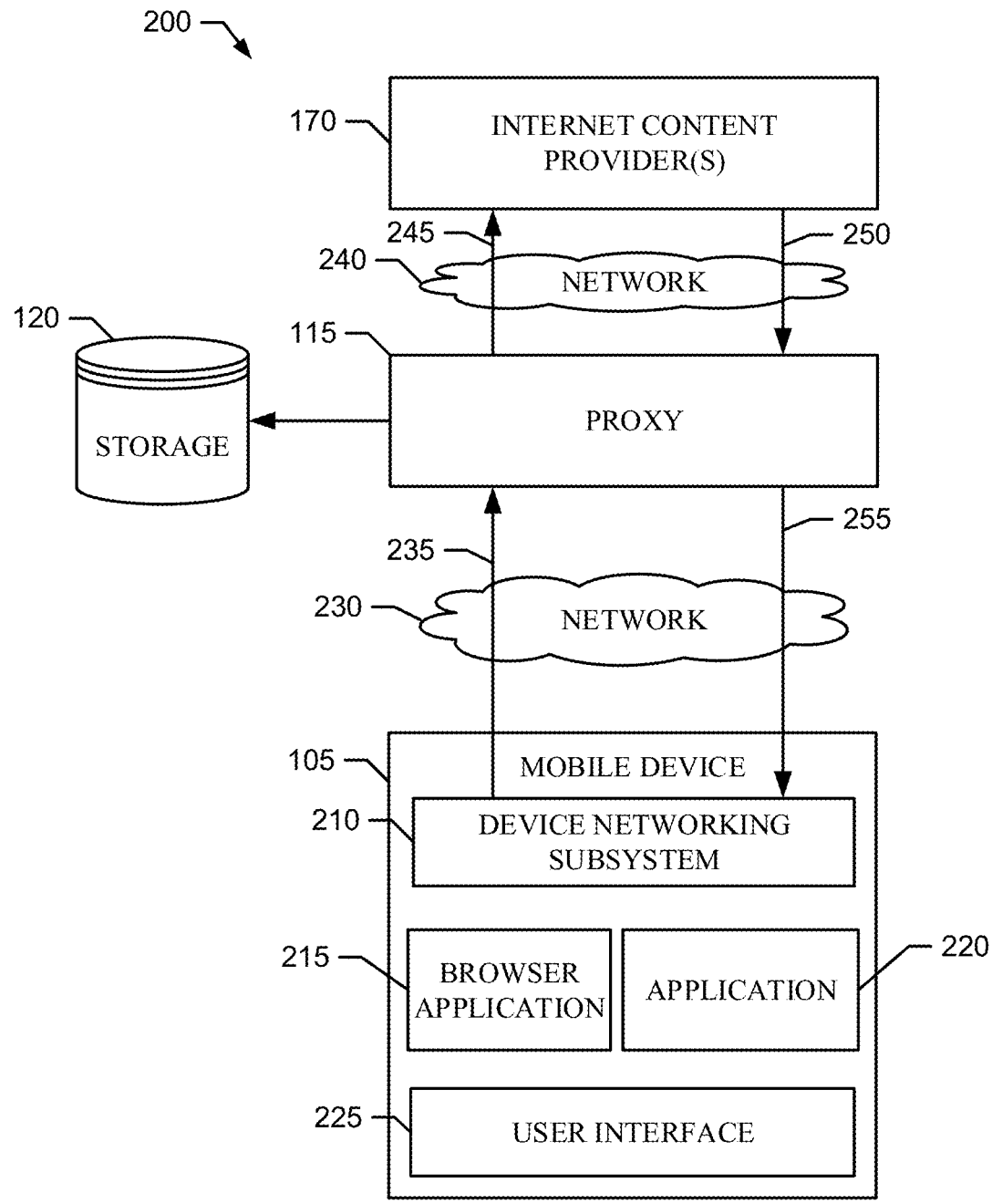
FIG. 2 is a block diagram illustrating an example request and response flow through the example system of FIG. 1.

FIG. 2 is a block diagram 200 illustrating an example request and response flow through the example system of FIG. 1. The block diagram 200 of FIG. 2 illustrates communication between the mobile device 105, a first network 230, the proxy 115, the data store 120, a second network 240, and the Internet content providers 170. The mobile device 105 includes a networking subsystem 210, a browser application 215, an application 220, and a user interface 225. In the example of FIG. 2, the block diagram illustrates a first request 235, a second request 245, a first response 250, and a second response 255.

The networking subsystem 210 provides a framework for transmitting and receiving content. The networking subsystem 210 may be implemented via an application processor, a software system that facilitates networked communication, a browser engine, a baseband processor that transmits network traffic, and/or any other system that provides a framework for transmitting and receiving content. As used in this context, "content" encompasses material of interest to a user such as entertainment, news, etc. as well as information that may not be of interest to the user such as advertisements. In the illustrated example, the networking subsystem 210 is implemented by the networking libraries provided in the Apple® iPhone® operating system. However, any other libraries, systems, or programs may additionally or alternatively be used.

The browser application 215 and application 220 are applications that are executed by a processor of the mobile device 205. The browser application 215 requests HTTP Internet content from Internet content providers 170, and renders the HTTP content for display. Additionally or alternatively, the browser application may request and render HTTPS Internet content. In some examples, the browser application is implemented by Apple® Safari®. However, any other application may alternatively be used. For example, Pocket Internet Explorer may be used. In some examples, the HTTP Internet content is HTML content. However, the content may be presented in any format that may be rendered by the browser application 215.

The application accessing Internet content 220 may be any application on the mobile device that requests Internet content. For example, the application accessing Internet content 220 may be a weather application accessing Internet content provided by www.weather.com. The Internet content provider 170 providing content for www.weather.com may respond to content requests with HTML data. However, any other type of data may be contained in the content request. For example, the Internet content provider 170 providing content for www.weather.com may provide an XML file containing a condensed weather forecast. Additionally or alternatively, the application accessing Internet content 220 may request media such as, for example, photos, video, audio, etc. Typically, applications accessing Internet content 220 are limited to a small amount of information to be displayed. For example, the weather application may not be able to display sports news. Although the browser 215 or the application accessing Internet content 220 may initiate requests for content, in some devices, such as the Apple® iPhone®, requests are formatted and transmitted by the device networking subsystem 210 based on system wide settings that control routing and/or addressing of such requests (e.g., to a specific port of a proxy 115).

The user interface 225 of the illustrated example provides a display to the user and receives input from the user. The user interface 225 may comprise hardware, a graphics library, and/or a graphics driver for displaying content to the panelist, and may comprise hardware, an input library, and/or an input driver for receiving input from the panelist. Either or both the browser application 215 and/or the application accessing Internet content 220 may utilize the user interface to display content and receive input.

The first and second networks 230, 240 of the illustrated example of FIG. 2 are public networks (e.g., the Internet). However, a private network may instead be employed for one or more of the first and/or second networks 230, 240. For example, a network internal to an organization and/or company may be used to determine how members of the organization and/or employees of the company utilize mobile devices. In the illustrated example, the first and second networks 230, 240 are Internet Protocol (IP) version 4 (IPv4) based networks. However, any other networking technology may additionally or alternatively be implemented. For example, the networks 230, 240 may implement the IP version 6 (IPv6) protocol.

The proxy 115 of the illustrated example receives a first request 235 for Internet content from the mobile device 105, retrieves the content by sending a second request 245 to the corresponding content provider 170, receives the content in a response 250 from the content provider 170, and relays the content to the mobile device 105 via a second response 255. In the illustrated example, the proxy 115 stores characteristics and/or identifiers of the request and/or response in the data store 120. These characteristics and/or identifiers may be, for example, a timestamp of the request and/or response, an IP address of the mobile device, a user agent of the request, a status code of the response, a content type of the response, etc. However, the proxy 115 may additionally store the Internet content of the response in the data store 120.

The illustrated example shows a communication stream for a single request. The first request 235 is transmitted to the proxy 165 from the mobile device 205 over the carrier network 230. The first request 235 uses the unique port assigned to the mobile device 105 (e.g., port 50,000), and is for HTTP content (e.g., the request is for content that is served over port 80). However, the content requested may be requested over any port. For example, the request may be for file transfer protocol (FTP) content and may occur over port 21. The proxy 115, upon receiving the first request 235, stores some or all of the request in the data store 120, and generates a second request 245. The second request is addressed to the Internet content provider 170 identified in the first request 235. The second request 245 in the illustrated example is transmitted via the second network 240 over port 80, because the first request 235 identified content to be served over port 80. The Internet content provider 170 responds to the second request 245 with the first response 250. The proxy 115 receives the first response 250 via port 80, stores some or all of the request in the data store 120, and forwards the content of the first response 250 as the second response 255 to the mobile device 105 over the port assigned to the mobile device 105.

Figure 3:
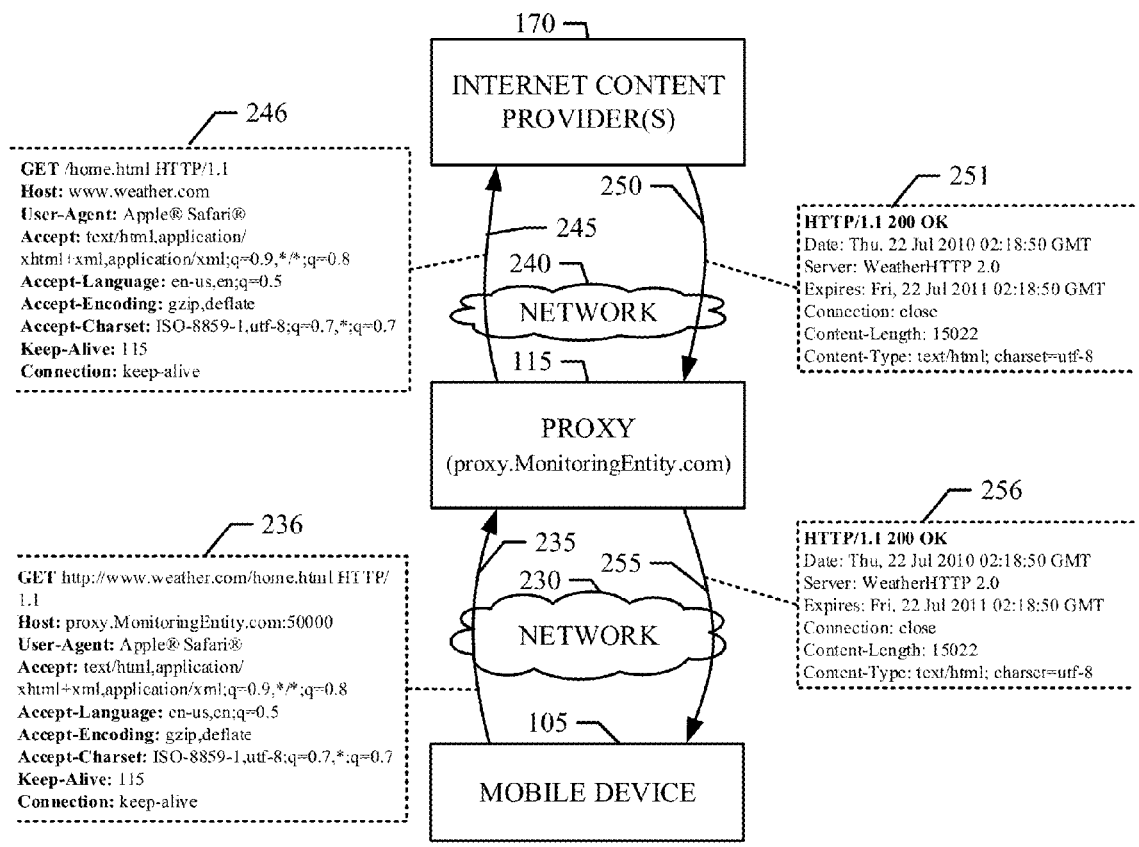
FIG. 3 is a block diagram illustrating an example request and response flow through the example system of FIG. 1.

FIG. 3 is a block diagram 301 illustrating an example request and response flow through the example system of FIG. 1. The block diagram 301 includes the proxy 115, the Internet content provider(s) 170, the mobile device 105, and the first and second networks 230, 240. The block diagram 301 additionally includes the first request 235, the second request 245, the first response 250, and the second response 255. Further, the requests and responses of the illustrated example are represented by HTTP request and response headers. The first request 235 is represented by the first HTTP request header 236 and the second request 245 is represented by the second HTTP request header 246. The first response 250 is represented by the first HTTP response header 251 and the second response 255 is represented by the second HTTP response header 256.

The first HTTP request header 236 is the header of a GET request generated by the mobile device 105. In the illustrated example, the Internet content provider 170 is identified by the absolute Universal Resource Locator (URL) identified in the first line of the first HTTP request header 236 and the address of the proxy 115 and uniquely assigned port are identified by the "Host" line of the first HTTP request header 236. The host identified in the illustrated example is proxy.MonitoringEntity.com, and the port that the request was made on is 50,000. However, any other address identifying the proxy 115, and any other port may alternatively be used. For example, the address identifying the proxy 115 may be the Internet Protocol (IP) address of the proxy 115. In the illustrated example, the absolute URL of the Internet resource is "http://www.weather.com/home.html". However, any other URL may additionally or alternatively be used.

The proxy 115 receives the first content request 235 and generates the second content request 245. The second content request 245 is represented by the second HTTP request header 246. In the illustrated example, the second HTTP request header 246 is a GET request directed to "http://www.weather.com", and is transmitted over port 80 as no port other than port 80 is identified in the header of the first content request 235. The content being requested from "http://www.weather.com" in the illustrated example is "/home.html". The proxy generates the contents of the second request by inspecting the first request 235. For example, the proxy 115 identifies the requested content of the first request 235 as "http://www.weather.com/home.html", determines that the port to be translated to is port 80 (identified by http://), determines that the Internet content provider 170 identified is "www.weather.com", and determines that the requested webpage from the Internet content provider is "/home.html". The second content request 245 is transmitted over port 80 because the proxy 115 determines that the requested content is HTTP content, and no alternative port number is specified.

In some examples, the content identified by a first content request may be content that is provided on a port other than port 80. For example, the mobile device 105 may seek to request content that is hosted on port 1234, rather than the default port (e.g., port 80). In that alternate example, an absolute URL of a first HTTP request header identifies the requested content as "http://www.weather.com:1234/home.html", to convey that the content identified by the request is provided on port 1234 (rather than the default port). Further, in such an example, the proxy 115 generates a second HTTP request header that identifies port 1234 (e.g., www.weather.com:1234).

The Internet content providers 170 receive the second content request 245, and respond to the request via the first response 250. The first response 250 is transmitted to the proxy 115. In the illustrated example, the first response is transmitted over port 80, as it is a response to a content request made on port 80. However, any other port may be used to transmit the first response to the proxy 115. The proxy 115 receives the first response 250, and determines the correct port that the second response 255 should be transmitted over. In the illustrated example, the proxy 115 determines the port that the second response should be transmitted over by associating the first response 250 with the first request 235 via the second request 245. In such an example, the proxy 115 can identify that the first request 235 originated on port 50,000, and thus, the second response should be transmitted on port 50,000. However, any other method of determining the port to transmit the second response over may additionally or alternatively be used. Further, the response may be transmitted over a port other than the port assigned to the mobile device 105.

FIG. 4 is an example data table of HTTP requests stored in the data store 120 by the proxy 115. The example data table 400 includes a device identifier column 410, a panelist identifier column 420, a timestamp column 430, and an HTTP request column 440. The ellipses (" . . . ") at the bottom of FIG. 4 indicates that the table contains a truncated version of the table for purposes of illustration. Moreover, in the illustrated example of FIG. 4, the example data table 400 includes data associated with a single device and a single panelist. However, in practice, the data table stored in the data store 160 by the proxy 115 will include data associated with any number of different devices and/or any number of panelists. Further, the example data table 400 illustrates an example time period of approximately eighteen minutes. However, in practice, the data table 400 stored in the data store 160 will include data associated with a longer time frame such as, for example, a hour, a day, a week, month, etc.

The example data table 400 of FIG. 4 includes a first row 450, a second row 460, a third row 470, a fourth row 480, and a fifth row 490. The first example row 450 of the illustrated example of FIG. 4 includes a record that identifies that an Apple iPhone associated with the panelist 50000 transmitted an HTTP request at 6:00:00 PM. The second example row 460 of the illustrated example of FIG. 4 includes a record that identifies that the Apple iPhone associated with the same panelist 50000 transmitted an HTTP request at 6:01:23 PM. The third example row 470 of the illustrated example of FIG. 4 includes a record that identifies that the Apple iPhone associated with the same panelist 50000 transmitted an HTTP request at 6:04:43 PM. The fourth example row 480 of the illustrated example of FIG. 4 includes a record that identifies that the Apple iPhone associated with the panelist 50000 transmitted an HTTP request at 6:15:39 PM. The first, second, and fourth example rows 450, 460, 480 include user agents identifying that the requests were associated with an ESPN application. The example HTTP requests of the example third row 470 includes a user agent identifying that the request was associated with an iPhone e-mail application. The example HTTP request of fifth example row 490 is associated with a Safari browser. However, the user agent(s) may associate their respective request(s) with any other application such as, for example, a YouTube application, a newsreader application, a browser application, etc. The fifth example row 490 of the illustrated example of FIG. 4 includes a record that indicates that the Apple iPhone associated with the same panelist 50000 transmitted an HTTP request at 6:17:42 PM.

As disclosed herein, the example table 400 represents a filtered record log that may be processed by the example application identifier 150 and/or the example duration calculator 155 to calculate durations of application usage associated with different applications.

While an example manner of implementing the example monitoring system 100 is illustrated in FIG. 1, one or more of the elements, processes and/or devices illustrated in FIG. 4 may be combined, divided, re-arranged, omitted, eliminated and/or implemented in any other way. Further, the example registrar 112, the example proxy 115, the example data store 120, the example user identifier 135, the example device identifier 140, the example request filter 145, the example application identifier 150, the example duration calculator 155, and/or, more generally, the example creditor 130, the example reporter 160, and/or more generally the example monitoring system 100 of FIG. 1 may be implemented by hardware, software, firmware and/or any combination of hardware, software and/or firmware. Thus, for example, any of the example registrar 112, the example proxy 115, the example data store 120, the example user identifier 135, the example device identifier 140, the example request filter 145, the example application identifier 150, the example duration calculator 155, and/or, more generally, the example creditor 130, the example reporter 160, and/or more generally the example monitoring system 100 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example registrar 112, the example proxy 115, the example data store 120, the example user identifier 135, the example device identifier 140, the example request filter 145, the example application identifier 150, the example duration calculator 155, the example creditor 130, and/or the example reporter 160 is/are hereby expressly defined to include a tangible computer readable storage device or storage disk such as a memory, a digital versatile disk (DVD), a compact disk (CD), a Blu-ray disk, etc. storing the software and/or firmware. Further still, the example monitoring system 100 of FIG. 1 may include one or more elements, processes and/or devices in addition to, or instead of, those illustrated in FIG. 1, and/or may include more than one of any or all of the illustrated elements, processes and devices.

Flowcharts representative of example machine readable instructions for implementing the example monitoring system 100 of FIG. 1 are shown in FIGS. 5, 6, 7, 8, and/or 9. In these examples, the machine readable instructions comprise a program(s) for execution by a processor such as the processor 1112 shown in the example processor platform 1100 discussed below in connection with FIG. 11. The program may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIGS. 5, 6, 7, 8, and/or 9, many other methods of implementing the example monitoring system 100 may alternatively be used. For example, the order of execution of the blocks may be changed, and/or some of the blocks described may be changed, eliminated, or combined.

As mentioned above, the example processes of FIGS. 5, 6, 7, 8, and/or 9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 5, 6, 7, 8, and/or 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

Figure 5:
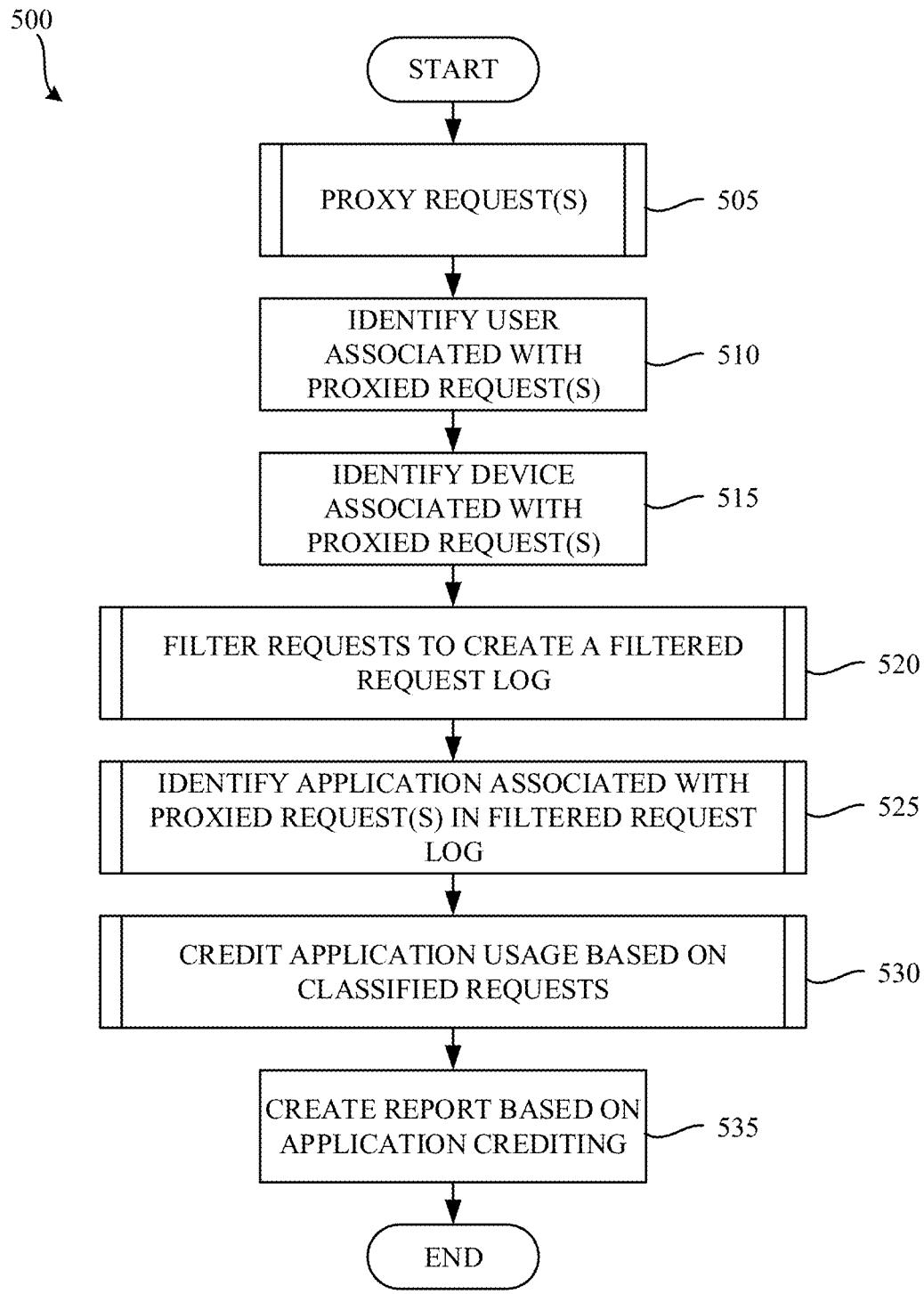
FIG. 5 is a flowchart representative of example machine-readable instructions that may be executed to implement the example monitoring system of FIG. 1.

FIG. 5 is a flowchart representative of example machine-readable instructions 500 that may be executed to implement the example monitoring system 100 of FIG. 1. The program 500 of FIG. 5 begins when the proxy 115 of FIG. 1 receives a request from the mobile device 105 (block 505). The proxy 115 proxies a request to Internet content providers 170, and stores a record of the request in the data store 120. An example procedure for proxying requests and storing data in the data store 120 is described in the illustrated example of FIG. 6. Once data is stored in the data store 120, the user identifier 135 of the illustrated example of FIG. 1 identifies a panelist associated with the proxy requests (block 510). In the illustrated example, the user identifier 135 identifies the panelists by performing a lookup in a panelist identifier table (e.g., the example table 125 of FIG. 1) based on, for example, a port number of the received request. In some examples, the user identifier 135 uses information other than the port identifier (e.g., a port number of the received HTTP request). For example, the example user identifier 135 identifies a panelist based on a username and/or password associated with the proxy request.

The device identifier 140 of the illustrated example of FIG. 1 identifies the device associated with the proxy request (block 515). In the illustrated example, the device identifier 140 identifies the device by performing a lookup of registration data and/or device data that is associated with the port number of the received request. However, any other method of identifying the device associated with the received request may additionally or alternatively be used. For example, the device identifier 140 may inspect the user agent of the received request to identify a device from which it was transmitted. In some examples, a user agent of the received request contains information about the operating system version and/or a hardware version of the device transmitting a request. In some examples, identifiers present in the user agent (e.g., version numbers) may be used to look up a device model in a lookup table. In some examples, the device identifier 140 identifies capabilities and/or features of the mobile device based on the lookup. For example, the device identifier 140 may identify that the mobile device includes, for example, a cellular radio, a sixteen gigabyte memory device, etc.

Despite having received device identifying information from the panelist (e.g., a device model such as, for example, an iPhone, an iPad, etc.), in some examples, it is beneficial to understand additional information about the device such as, for example, a model number, a size of available memory (e.g., eight gigabytes, sixteen gigabytes, etc.), an operating system version identifier, etc. Such information may be difficult to receive from a panelist and/or may be inaccurate if, for example, the panelist does not remember (or know) which operating system version identifier their mobile device is using. In some examples, not all requests transmitted by the mobile device 105 include such device identifying and/or feature identifying data (e.g., a model number, a size of available memory, etc.). However, some applications, such as "App Store" applications (e.g., apple iTunes, Google Play), transmit device and/or feature identifying data. App store applications typically transmit this information to ensure that a correct version of an application to be downloaded and/or installed on the mobile device is retrieved. For example, an application that operates on an iPhone may not operate correctly on an iPad, an application may require a minimum operating system version identifier. In some examples, the device identifying and/or feature identifying information may only be included when the HTTP request is transmitted by an "App Store" application of the mobile device. In such an example, panelists may be asked to periodically access the "App Store" application to trigger an HTTP request that conveys the device identifying information to the monitoring entity via the user agent. In some examples, the device identifier 140 responds to such an HTTP request by updating a table associating device information with a panelist. Such information may be useful for identifying which devices and/or versions of devices are in use by panelists.

The example request filter 145 of the illustrated example of FIG. 1 then filters the requests stored at block 505 to create a filtered request log (block 520). An example filtered request log is shown in FIG. 4. The filtered request log does not include HTTP requests that cannot be credited to an application and/or browser. An example method of filtering the stored requests is described below in the illustrated example of FIG. 7. In some examples, the example request filter 145 filters based on one or more properties of an HTTP response (e.g., a response to a request made by the mobile device 105 via the proxy 115). Response headers (e.g., an HTTP response header) and/or response bodies (e.g., an HTTP response body) may be analyzed to filter the requests. For example, a content type of a response may be used to filter an associated request, a response code (e.g., an HTTP status code) may be used to filter an associated request, etc.

In some examples, the example request filterer 145 filters some of the received HTTP messages (e.g., HTTP requests and/or HTTP responses) when they are received by the proxy 115 to determine whether a record associated with the HTTP message should be stored in the data store 120. Filtering the messages when they are received reduces the amount of data that must be stored in the data store 120, as less HTTP messages may be stored when compared to storing all received HTTP messages. As an additional benefit, the amount of processing time required to post-process the stored records is reduced, as less records are later processed by the example request filterer 145.

The example application identifier 150 of the illustrated example of FIG. 1 identifies an application that transmitted each request in the filtered request log (block 525). In examples disclosed herein, the application identifier 150 identifies the application associated with each request based on a user agent and/or a universal resource locator (URL). However, any other identifier may additionally or alternatively be used. An example method of identifying the application associated with a request is described in the illustrated example of FIG. 8. In some examples, identifying an application that transmitted the request is performed at the time that the request is received.

Based on the filtered and identified (e.g., application resolved) requests, the duration calculator 155 credits application(s) with representative usage durations (block 530). In examples disclosed herein, the duration calculator 155 calculates a duration of usage of an application based on differences between records associated with a same application. An example method of calculating a duration of usage of an application is described in the illustrated example of FIG. 9.

Figure 10:
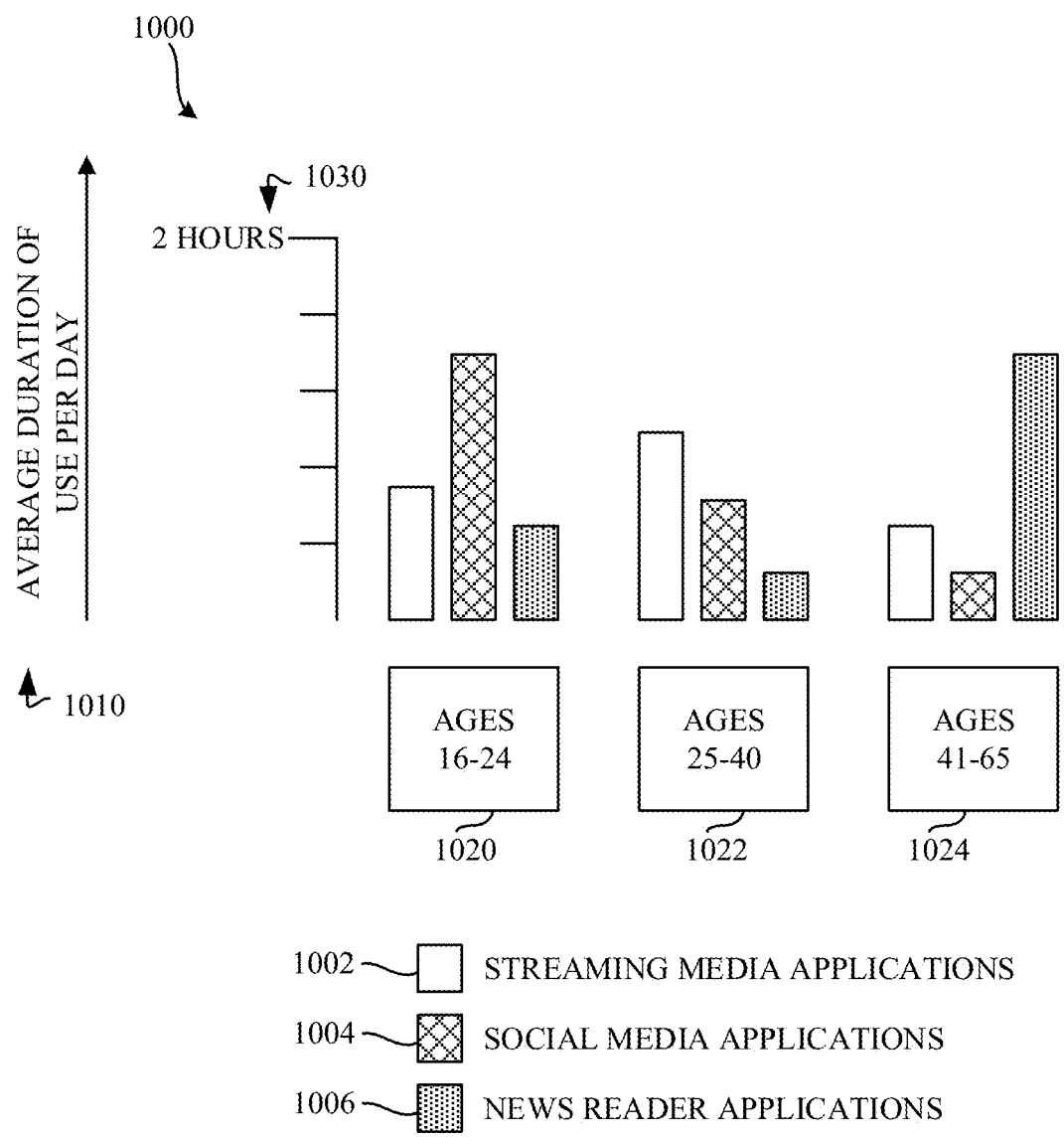
FIG. 10 illustrates an example report that may be created by the example reporter of FIG. 1.

Based on the application crediting data, the reporter 160 generates a report (block 535). In the illustrated example, the example report identifies application usage across different types of mobile devices and/or demographics of panelists. For example, the reporter 160 may generate a report indicating that a first demographic of user is more likely to use (and/or purchase) a first application than a second demographic. An example report is shown in FIG. 10.

Figure 6:
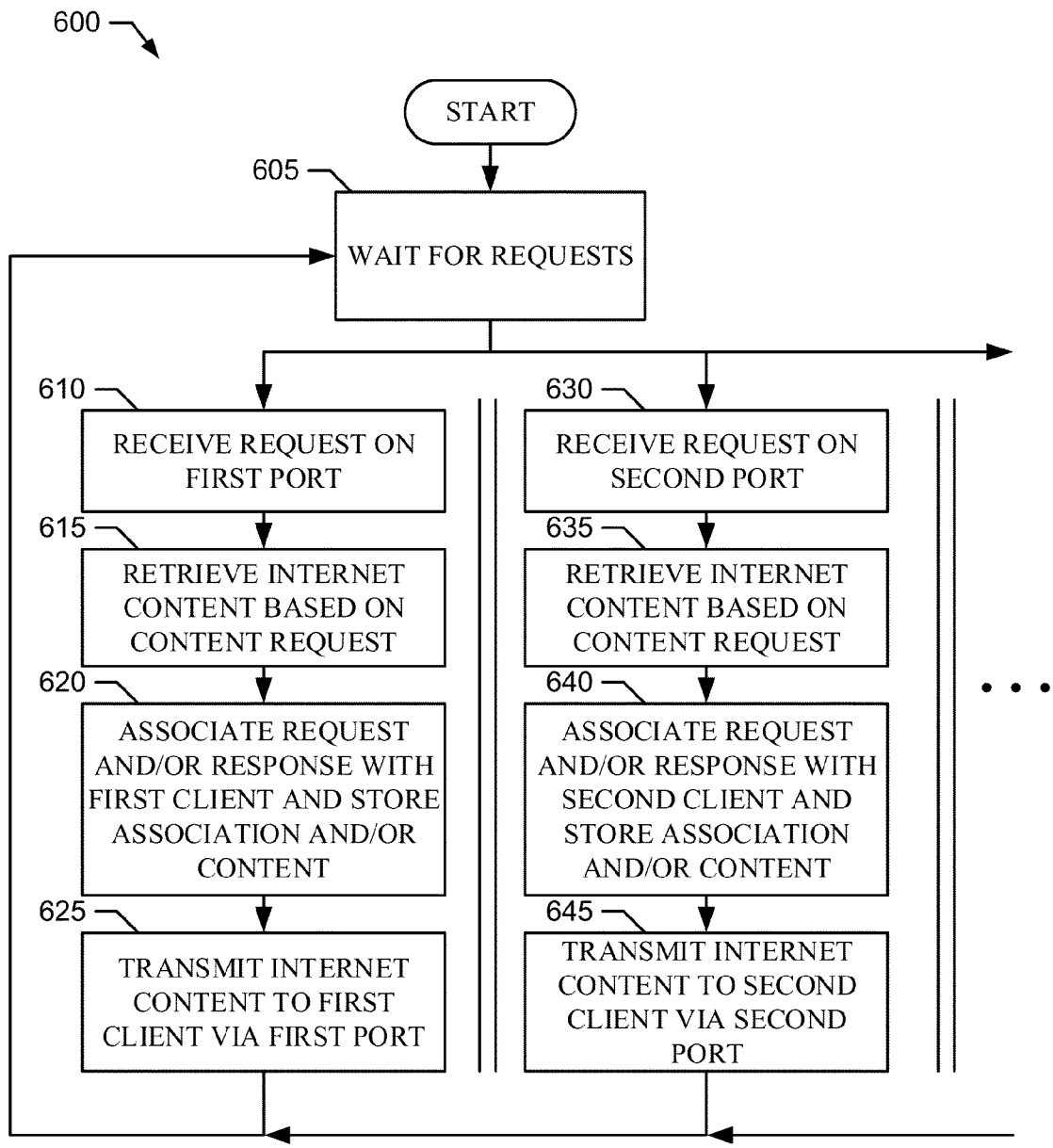
FIG. 6 is a flowchart representative of example machine-readable instructions that may be executed to implement the example proxy of FIG. 1.

FIG. 6 is a flowchart representative of example machine-readable instructions 600 that may be executed to implement the example proxy 115 of FIG. 1. The program of FIG. 6 illustrates an example implementation of block 505 of FIG. 5. The process 600 of FIG. 6 begins at block 605, where the example machine-readable instructions 600 begin execution. First, the proxy 115 waits for content requests (block 605). In the illustrated example, the proxy 115 waits for content requests only on ports assigned to a mobile device. However, the proxy 115 may wait for content requests on any or all ports. Additionally, the proxy 115 may inspect the Internet Protocol (IP) address against known range(s) of IP addresses to determine if the request should be serviced. For example, the known range of IP address may include ranges of IP addresses which are assigned to a particular Internet service provider and/or carrier. This may, for example, restrict use of the proxy 115 to mobile devices. If the proxy 115 determines that the request did not originate from an IP address within the particular Internet service provider, the proxy 115 may ignore the request. In some examples, the proxy 115 inspects a user agent of an incoming request to determine whether the request should be serviced. For example, if the user agent is associated with a desktop application (e.g., a desktop browser, etc.), the request may be blocked. Desktop applications do not reflect mobile device activity and, accordingly, should not be allowed to influence monitoring results associated with mobile device activity. In some examples, requests identified as having come from a device (rather than an application) that does not reflect mobile device activity (e.g., a request from a desktop computer, a request from an Internet enabled television, etc.) may be blocked.

Next, the proxy 115 receives a content request on a port. Because multiple requests for content may be received at substantially the same time, the proxy 115 may receive a first content request on a first port (block 610) and a second content request on a second port (block 630). In the illustrated example, the content requests are processed in parallel to decrease the amount of time taken to respond to requests. However, the content requests may be processed in any other manner. For example, the content requests may be processed serially. The parallel processing of any number of requests is represented in FIG. 6 by these dots "●●●".

Next, the proxy 115 generates second request(s) based on corresponding ones of the request received at blocks 610 and 630, to retrieve the Internet content identified in the corresponding content requests (blocks 615 and 635). The proxy 115 also associates the content requests and/or responses with the corresponding requesting device and stores the association in the data store 120 (blocks 620 and 640). In the illustrated example, the proxy 115 associates the first content request with the corresponding mobile device using the port number that the request was received upon. In some examples, the proxy 115 associates the response to the request with the corresponding mobile device. The response may include information that may be useful for crediting purposes (e.g., an HTTP content types, an HTTP status code, an HTTP response body such as contents of a webpage, etc.) Since each port is used only by a single mobile device, each mobile device can be uniquely identified based on the port number of the port on which a request is received. Further, when storing the association in the data store 120, the proxy 115 may store one or more identifier(s) of the port, the client device, the panelist, etc. In some examples, the application that transmitted the request is identified and stored in the data store 120 at this point, rather than post-processing the received request(s). Additionally, the proxy 115 may store the returned content or a portion of the returned content in the data store 120 (block 620, 640).

The proxy 115 may filter what is stored in the data store. For example, the proxy 115 may only store content requests that request HTTP content, as requests for non-HTTP content may not be parsed properly when analyzing the information. As another example, the proxy 115 may omit style content (e.g., cascading style sheet (CSS) documents) from being stored in the data store 120, as style content may be of limited use when analyzing the information.

The proxy 115 finishes servicing the request from the client device by transmitting the requested Internet content to the client device via the port on which the content request was received (blocks 625 and 645). In some examples, the proxy 115 stores the body of the request. In some other examples, the proxy 115 stores the content of the response to the request. Control returns to the block 605, where the proxy 115 waits for more content requests (block 605).

Figure 7:
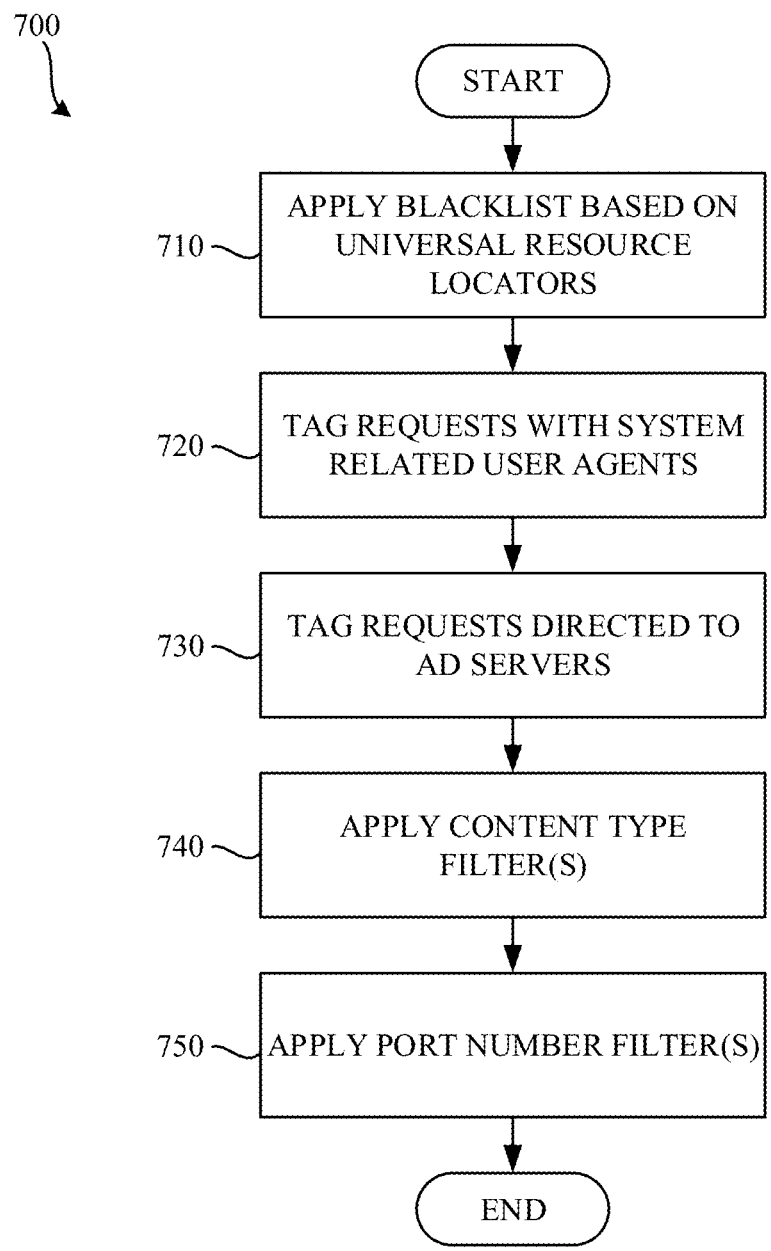
FIG. 7 is a flowchart representative of example machine-readable instructions that may be executed to implement the example creditor of FIG. 1.

FIG. 7 is a flowchart representative of example machine-readable instructions 700 that may be executed to implement the example creditor 130 of FIG. 1. The program of FIG. 7 illustrates an example implementation of block 520 of FIG. 5. The process 700 of FIG. 7 begins when the request filter 145 filters requests stored in the data store. The example request filter 145 applies a blacklist based on universal resource locators (URLs) of the requests stored in the data store 120 (block 710). Some URLs are related to non-user initiated activities. Such URLs may include, for example, URLs associated with analytics, tracking, measurement robots, advertisement objects, etc. In some examples, the request filter 145 only applies the URL filter when a particular user agent is used (e.g., a user agent associated with a browser such as, for example Safari). Applying such a two-part filter enables the request filter 145 to remove HTTP requests that are not associated with actual browsing and/or user activity. In some examples, the filtering happens on the fly such that these requests are not recorded and/or are deleted almost immediately after they occur.

The example request filter 145 tags requests with user agents related to mobile device system functionality (block 720). Some applications, such as, location applications, app store applications, email applications, newsreader applications, etc. transmit requests for content automatically (e.g., without user instruction). That is, as a result of the requests with user agents related to mobile device system functionality, no visual indicators are shown on the mobile device display. For example, an e-mail application may send a request to an e-mail server to determine whether any new messages are present and/or are to be downloaded. Such a request from an e-mail application may occur periodically and/or a periodically and is not necessarily performed as a result of user interaction with the mobile device.

The example request filter 145 tags requests directed to advertisement servers (block 730). In the illustrated example, advertisement servers are identified based on a known list of advertising servers. The list may periodically and/or a-periodically be updated to identify newly identified advertisement and/or advertising servers. Advertising traffic primarily occurs when using a browser (e.g., to view a website that includes an advertisement). In the illustrated example, browser records (e.g., HTTP requests that can be identified as being associated with a browser such as, for example, Safari) should be tagged as related to advertisement server activity when they are directed to an advertisement server. For example, browser records may be tagged as advertisement server activity based on identification of URLs directed to application advertisement servers. In the illustrated example, these records are not ignored and, instead, are kept so that they can be included in ad server traffic reporting. However, records tagged as directed to tracking scripts, bots, and/or analytics scripts are not considered when calculating a duration of usage of an application as they do not represent user activity. Records tagged as related to advertisement server activity that identify an application being used may be used to credit applications and the duration spent using an application.

The example request filter 145 applies a content type filter to remove records having particular content types (block 740). As described above, advertisement and/or tracking requests (see Blumenau, U.S. Pat. No. 6,108,637, which is hereby incorporated by reference in its entirety) are commonly sent when applications are running. In some examples, the advertisement and/or tracking requests are the only type(s) of requests that applications transmit. For example, a game application that does not request information from a network resource as part of the gameplay functionality may include advertisements (e.g., at the top and/or bottom of the screen). Such advertisements may be requested and categorized as advertisement traffic based on, for example, a URL to which they were directed. While it may not be possible to identify applications based on the advertising traffic (because, in some examples, the advertising traffic is generic to multiple applications), knowing that the advertising traffic occurred factors into how other applications are credited because, for example, it is known that a game was played while another application was not. In some examples, the advertising traffic uses particular content types that must be included in the results for determining how long a particular application was executed.

In the illustrated example, a white list is used for filtering content types. That is, requests having a content type that is included on the white list are not filtered and/or removed from the HTTP record blogs. In an illustrated example, the whitelist of content types includes, for example, application/XHTML+XML, application/text/HTML, application/text, application/j son, application/XML, application/binary, application/octet stream, text/vnd.wap.wml, application/PDF, application/MSWord, text/HTML, text/XML, etc. However, any other content type(s) may additionally and/or alternatively be used. In the illustrated example, there are some content types that are not included in the whitelist. For example, the content types text/CSS, text/x-cross-domain-policy, text/javascript, text/x-js, and text/cfg are example content types that are not included in the whitelist. While in the illustrated example a white list is used, any other approach for filtering records management alternately be used such as, for example, a blacklist.

The example request filter 145 applies a port number filter to remove records having particular port numbers (block 750). As described above, panelists are each assigned a unique port number to use when sending HTTP requests. The example request filter 145 applies a port number filter to remove records that are not associated with a panelist. In the illustrated example, the port number filter is a whitelist including port numbers that are associated with respective panelists. For example, if no panelist is associated with port 12345, HTTP requests received port 12345 may be removed from the HTTP log. In some examples, the filter is implemented as a blacklist, in that HTTP requests made via ports that are not related to panelist traffic are removed. For example, the example request filter 145 may remove HTTP communications that were received via port 80. Port 80 is associated with the HTTP protocol and is not assigned to a panelist. In some examples, when the mobile device 105 requests proxy configuration details (e.g., prior to when the mobile device is configured to transmit requests via the proxy 115), such requests are made via port 80. Because requests for configuration information do not represent user activity they can be ignored and/or removed by the request filter 145.

While in the illustrated example of FIG. 7 the example request filter 145 applies a number of different filters (e.g., a port filter 146, a user agent filter 147, a URL filter 148, etc.), any other number and/or types of filters may additionally or alternatively be used such as, for example, a filter based on HTTP status messages, a filter based on a HTTP method (e.g., get, post, etc.), etc.

Figure 8:
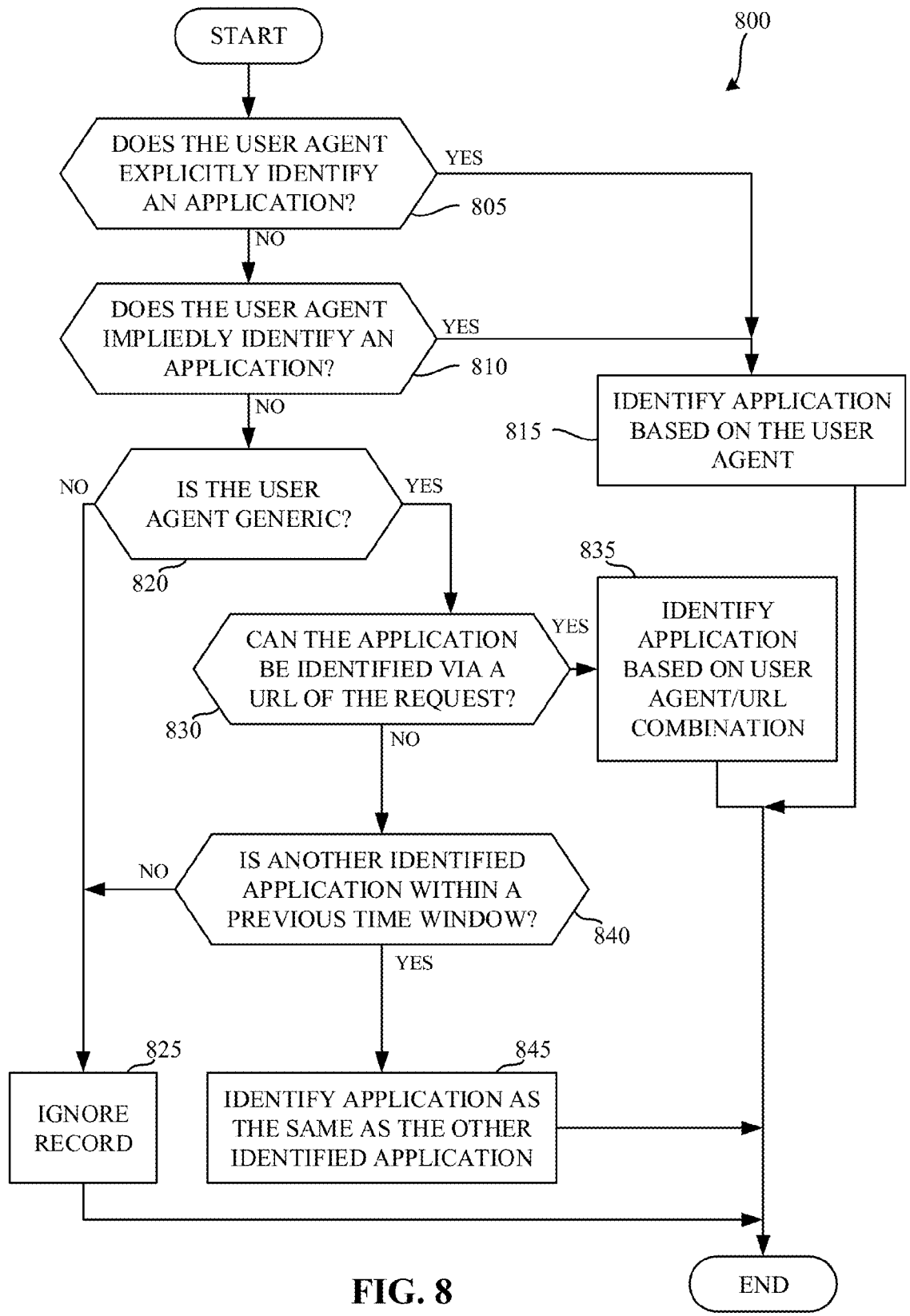
FIG. 8 is a flowchart representative of example machine-readable instructions that may be executed to implement the example creditor of FIG. 1.

FIG. 8 is a flowchart representative of example machine-readable instructions 800 that may be executed to implement the example creditor 130 of FIG. 1. The example program 800 of the illustrated example of FIG. 8 illustrates an example implementation of block 525 of FIG. 5. The process 800 of FIG. 8 begins when the application identifier 150 receives an HTTP request including a user agent. In the illustrated example, the application identifier 150 inspects the requests stored in the filtered request log (e.g., in the data store 120). In the illustrated example, the application identifier 150 determines whether the user agent of the HTTP request explicitly identifies an application (block 805). In some examples, the user agent includes a name of an application that transmitted the associated HTTP request. For example, a siriusXM application may include the name siriusXM within the user agent. In the illustrated example of FIG. 4, row 490 includes an HTTP request that expressly indicates that the request came from Apple® Safari®. If the user agent explicitly identifies the application (block 805), the application identifier 150 identifies the application based on the user agent (block 815). If the user agent does not explicitly identify the application (block 805), the example application identifier determines if the user agent is impliedly identifies the application (block 810). In some examples, the user agent does not directly include a name of an application with which it is associated. For example, an ESPN application may include a name of "SportCenter" within the user agent. That is, the user agent, while not directly identifying the name of the application, may indirectly identify the application by use of an alternate name. In the illustrated example of FIG. 4, rows 450, 460, 480 includes an HTTP request that impliedly indicates that the request came from the ESPN application. In the illustrated example, the application is identified by performing a look up of alternate names based on an alternate name table. Additionally or alternatively, the user agent may correspond to a user agent pattern that has been identified as being used by a particular application (e.g., empirically and/or as specified by an application developer). If the user agent impliedly and/or indirectly identifies an application (block 810), the application identifier 150 identifies the application based on the user agent (block 815).

In some examples, the user agent may not include a name that directly and/or indirectly identifies the application that transmitted the associated HTTP request (blocks 805, 810). In such an example, the application identifier 150 determines if the user agent is a generic user agent (block 820). For example, some applications use a standard application programming interface (API) and/or software development kit (SDK) (e.g., webkit) which, when used, sets a default user agent identifying the API and/or SDK. In some examples, it may be possible to identify the application based on other parameters of the HTTP request (e.g., a URL), despite the generic user agent. If the user agent of the HTTP request is not generic (block 820), and the user agent does not impliedly and/or explicitly identify the associated application (blocks 805, 810), the application identifier 150 ignores the record associated with the HTTP request (block 825). In examples disclosed herein, when the record is ignored (block 825), a duration of presentation is not calculated for the application. However, the record is not excluded from the log as it may indicate that the user switched from one application to another.

If the user agent does not identify the application (blocks 805, 810), but instead is generic block 820, the example application identifier 150 determines whether the application can be identified via a universal resource locator of the request block 830. An application may be known to transmit requests to a particular URL. For example, a sports application may routinely transmit request to a sports website and/or webserver. Identifying that the request is sent to the sports website and/or webserver may identify the application that transmitted the request. In the illustrated example, the application is identified by performing a lookup against a table associating URLs and/or domain names that are associated with a particular application. Accordingly, if the example application identifier 150 can identify the application based on the URL of the associated HTTP request, the application identifier 150 identifies the application based on the user agent and universal resource locator combination (e.g., the generic user agent and the URL) (block 835).

If the application cannot be identified by URL of the request (block 830), the application identifier 150 determines if any other identified application exists within a previous time window (block 840). In the illustrated example the application identifier 150 uses a previous time window of fifteen minutes. However, any other time window may additionally or alternatively be used. In the illustrated example, the application identifier 150 determines that other identified application exists by comparing the user agent of the instant request with previous requests to identify HTTP requests that are associated with the same user agent. User agents of applications do not typically change. That is, applications do not typically change their user agent unless a change to the application is also made. For example, a user agent may change when an application is upgraded from a first version (using a first user agent) to a second version (using a second user agent different from the first user agent). As a further example, the first version of the application will typically only use the first user agent. Accordingly, HTTP request that include a user agent other than the user agent of the instant record are not likely to have come from the same application. If the example application identifier 150 identifies an HTTP request with the previous time window that used a same user agent (block 840), the example application identifier 150 identifies the application of the instant HTTP request as the same application as the HTTP request in the previous time window. If no previous request is identified (block 840), the example application identifier 150 ignores the record (block 825). In examples disclosed herein, when the record is ignored (block 825), it is not included in the duration calculation described in connection with FIG. 9.

In examples disclosed in FIG. 8, the application identifier 150 parses each filtered request in the filtered request log created by the request filter 145. That is, the example process 800 of the illustrated example of the FIG. 8 is performed for each record in the filtered request log. As an outcome of the application identification process, each record is identified as either "app resolved," "unknown," or "ignored". App resolved records represent records where an application associated with the HTTP request is identified. In contrast, unknown and/or ignored records represent records where the application associated with the HTTP request cannot be identified.

Figure 9:
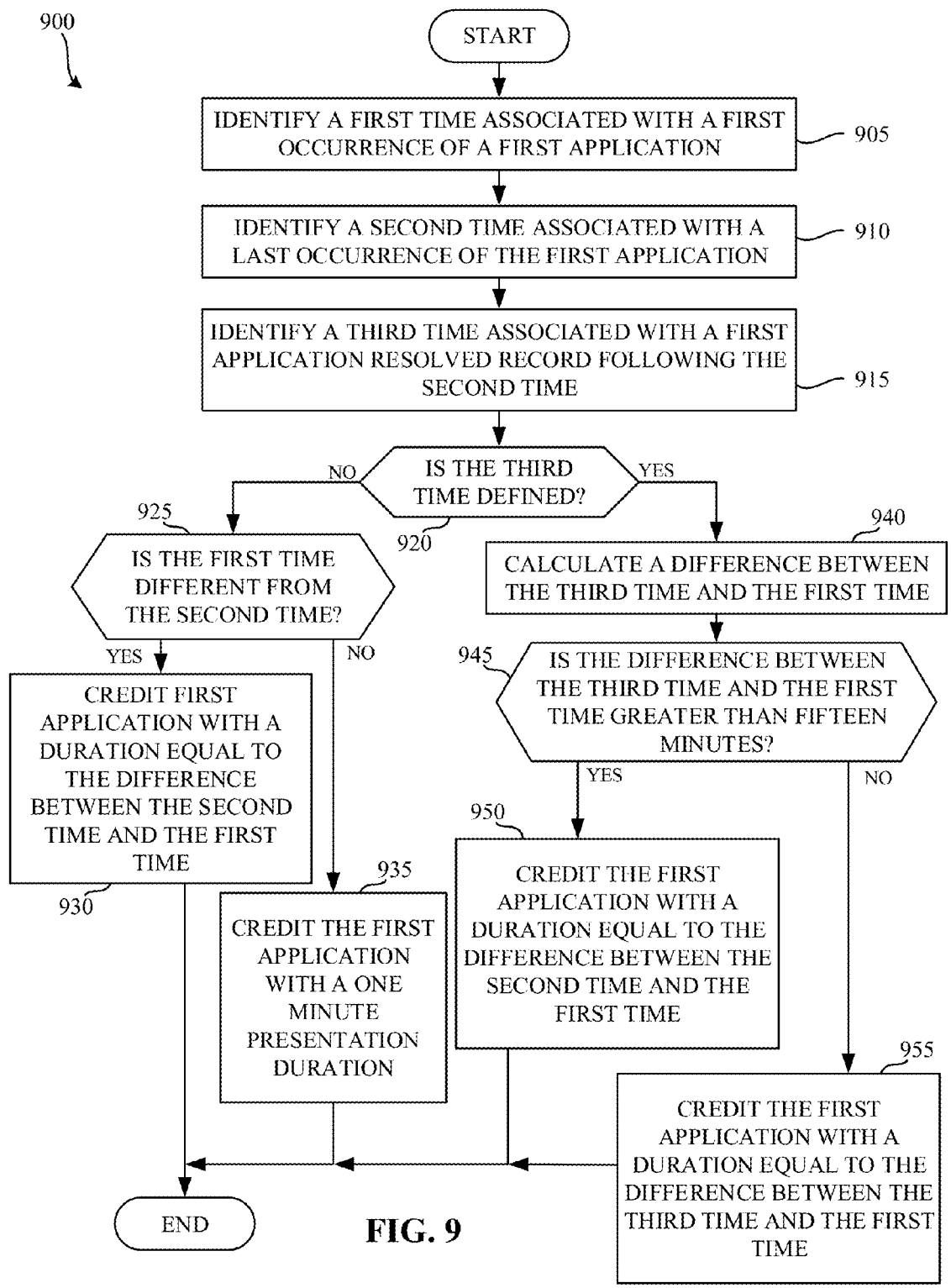
FIG. 9 is a flowchart representative of example machine-readable instructions that may be executed to implement the example creditor of FIG. 1.

FIG. 9 is a flowchart representative of example machine-readable instructions 900 that may be executed to implement the example creditor 130 of FIG. 1. The example process 900 of the illustrated example of FIG. 9 illustrates an example implementation of block 530 of FIG. 5. FIGS. 9A, 9B, 9C, 9D, and 9E illustrate example timelines 960, 970, 980, 990, 994 of HTTP requests that may be credited by the example creditor 130 of FIG. 1. The example process 900 of FIG. 9 is described with respect to the example timelines 960, 970, 980, 990, 994 of FIGS. 9A, 9B, 9C, 9D, and 9E. The example events of FIG. 9A correspond to the example table 400 of FIG. 4. The examples of FIGS. 9B, 9C, 9D, and 9E, while similar to the example table 400, do not represent the example table 400. Rather, FIGS. 9B, 9C, 9D, and 9E represent alternative timelines.

The process 900 of FIG. 9 begins when the application identifier 150 has identified applications associated with the HTTP request in the filtered request log. The example duration calculator 155 begins parsing the filtered request log (e.g., the filtered request log 400 of FIG. 4) by identifying a first time associated with a first occurrence of a first application (block 905). Example first times are shown in FIGS. 9A, 9B, 9C, and 9D as times 961, 971, 981, and 991. With respect to the example of FIG. 9A, the first time 961 is identified by performing a lookup of a timestamp associated with the HTTP request in the example table 400 of FIG. 4 (e.g., the timestamp column 430). In the illustrated example, the duration calculator 155 identifies the first chronologically application resolved record from a particular application. In examples disclosed herein, the mobile device 105 only allows one application to be executed at once. However, some mobile devices allow more than one application to be executed at a time.

The example duration calculator 155 then identifies a second time associated with a second occurrence of the first application (block 910). The second time represents the last occurrence of the same identified application of the first time. In the illustrated example, the second time is identified when there are no application resolved (e.g., "app resolved") records from another application having a time of occurrence between the first time and the second time. If, for example, a record from another application were stored in between the first time in the second time, that intermediate record might indicate that the user switched from a first application to a second application, and then back to the first application. With respect to FIGS. 9A, 9B, 9C, and 9D, a second time is shown as times 966, 972, 981, and 992. In examples disclosed herein, the second application may be a resolved application and/or an unknown application. In some examples, the duration calculator 155 identifies the second time only when there are no consecutive records between the first time and the second time whose time difference is more than a threshold. For example, in FIG. 9C, the record 981 at 6:00:00 PM is more than fifteen minutes away from the record 982 at 6:15:39 PM. Accordingly, the record 981 is identified as both the first time and the second time. In the illustrated example, the threshold is fifteen minutes, however any other threshold may additionally or alternatively be used. Identifying gaps in the HTTP request log is important because such gaps indicate user inactivity.

The example duration calculator 155 then identifies a third time associated with a first application resolved record following the second time. The application associated with the third time is not the same as the application associated with the first time. With continued respect to the example 980 of FIG. 9C, the record 982 at 6:15:39 PM represents the same application (e.g., ESPN) as the record 981 at 6:00:00 PM and, accordingly, the record 982 is not identified as the third time. That is, the third time represents a time at which the user transitions from a first application to a second application. In some examples, the transition to the second application occurs sometime after a final HTTP request of the first application is transmitted. However, in some examples, the first HTTP request transmitted by the second application occurs upon a launch of the second application. That is, in some examples, the first application was presented until the third time. With respect to the example 970 of FIG. 9B, the record 974 at 6:04:43 PM is associated with a different application than the record 972 (which is identified as the second time), and accordingly, the record 974 at 6:04:43 is identified as the third time.

Figure 9A:
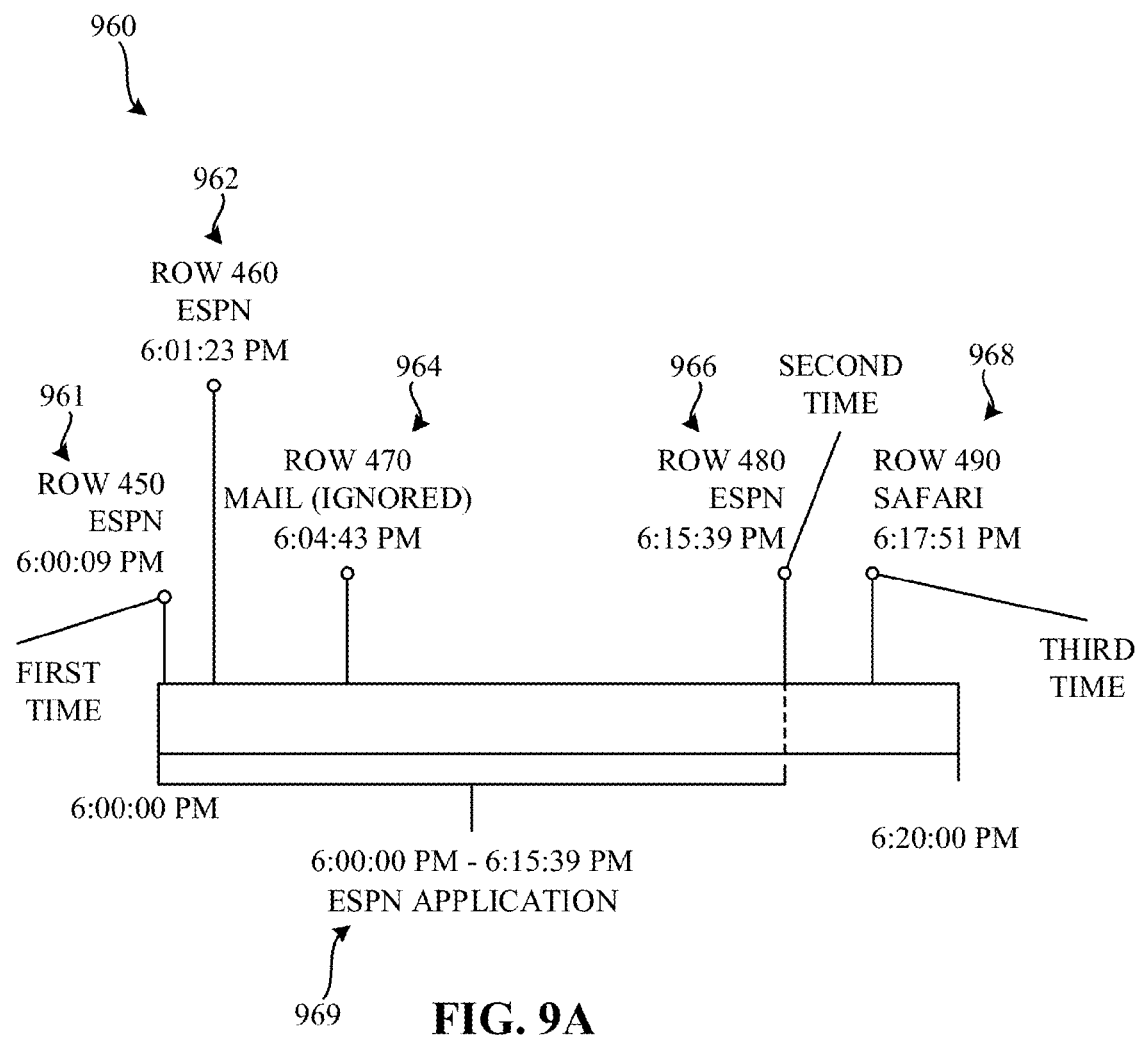
FIGS. 9A, 9B, 9C, 9D, and 9E illustrate example timelines of HTTP requests that may be credited by the example creditor of FIG. 1.
Figure 9B:
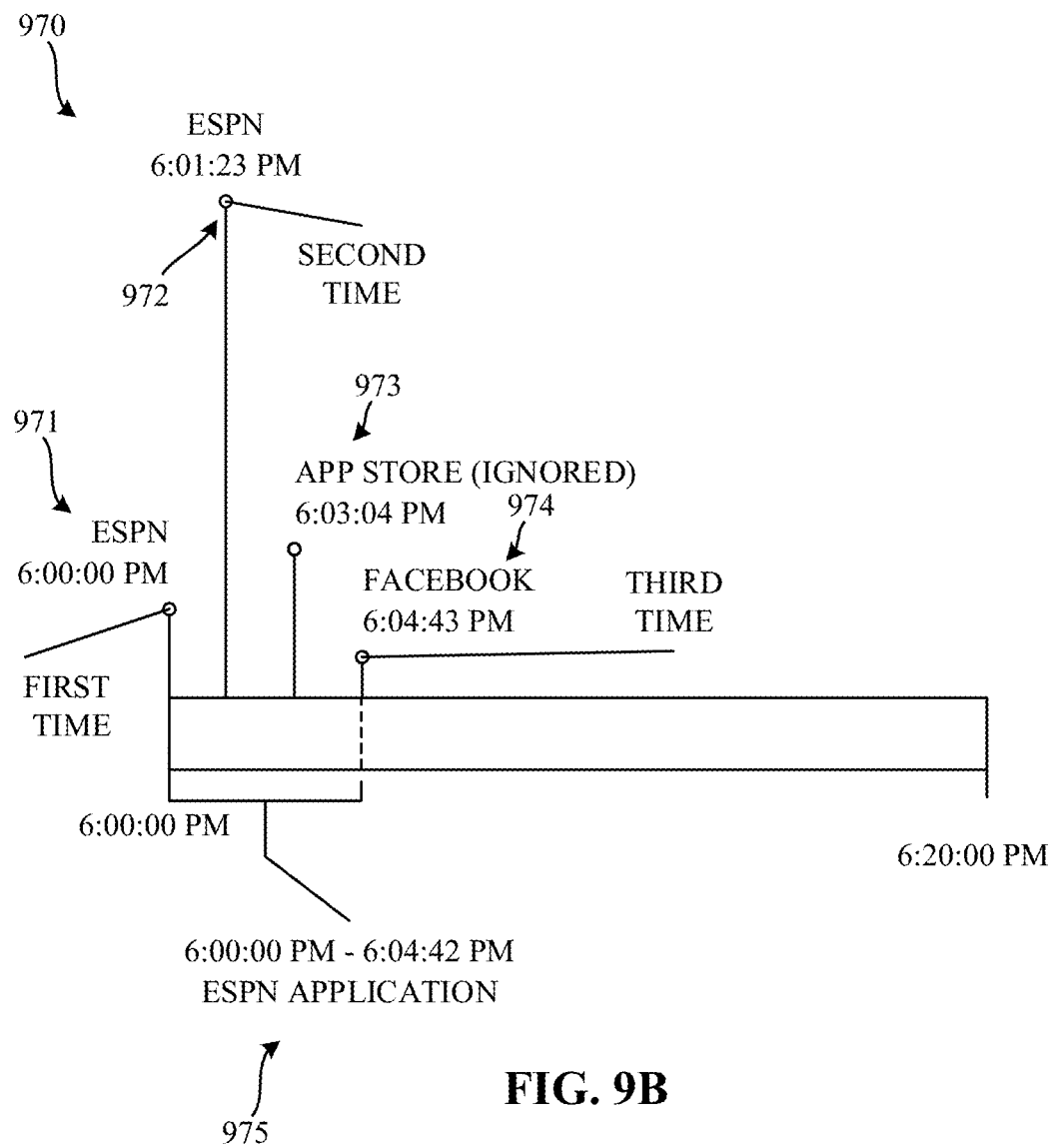
Figure 9C:
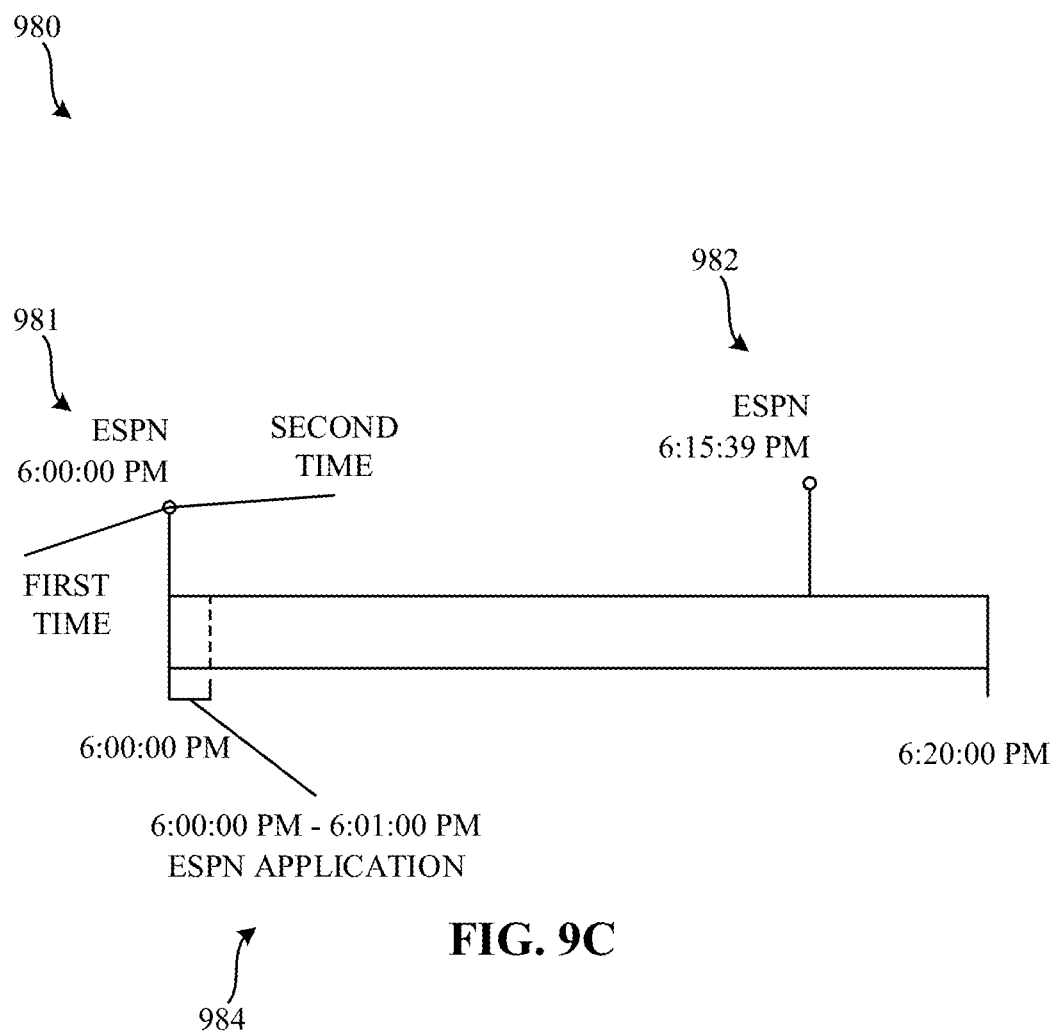
Figure 9D:
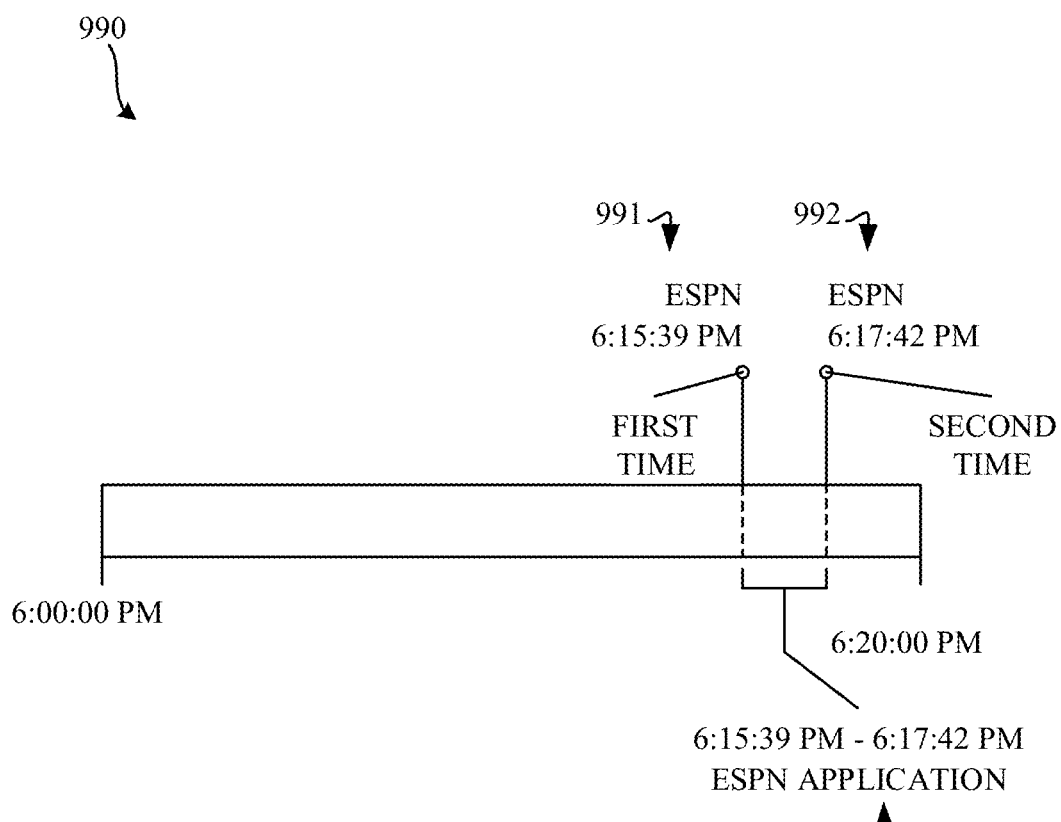

In some examples, the third time may not be defined. That is, no records may exist after the second time. With respect to the examples 980, 990 of FIGS. 9C and 9D, no records are identified as the third time. In the illustrated example, the example duration calculator 155 determines whether the third time is defined (block 920). The illustrated example of FIG. 9C shows an example where a third time is not defined. If the third time is not defined (block 920), the duration calculator 155 determines that the first time is different from the second time (block 925). If the first time is different than the second time (block 925), the duration calculator 155 credits and application associated with the first time with a duration of presentation equal to the difference between the second time and the first time (block 930). In the illustrated example of FIG. 9D, the first time is different from the second time (for both instances of HTTP records 991, 992) and a third time is not defined. Accordingly, the record 991 is credited with a presentation duration 993 equal to the difference between the first time and the second time.

If the first time is not different from the second time (e.g., the first time and the second time are both associated with a same HTTP request), the example duration calculator 155 credits the first application with a minimal presentation duration. In the illustrated example of FIG. 9C, the first time is not different from the second time (for both instances of HTTP records 981, 982) and a third time is not defined. Accordingly, the record 981 is credited with a minimal presentation duration 984. In the illustrated example, the minimal presentation duration is one minute. However, any other minimal presentation duration may additionally or alternatively be used such as, for example, thirty seconds, ten seconds, two minutes, etc.

Referring back to block 920, if the third time is defined, the duration calculator 155 calculates the difference between the third time and the first time (block 940). The illustrated examples of FIGS. 9A and 9B show example timelines 960, 970 where a third time is defined. The duration calculator 155 then determines if the difference between the third time and the first time (calculated in block 940) is greater than a threshold (block 945). In the illustrated example, the threshold is fifteen minutes. However, any other threshold may additionally or alternatively be used. If the difference between the third time and the first time is greater than the threshold (block 945), the example duration calculator 155 credits the first application with the duration equal to the difference between the second time and the first time (block 950). With respect to the illustrated example of FIG. 9A, the difference between the first time (record 961) and the third time (record 968) is greater than the threshold. Accordingly, the application associated with the first record 961 (e.g., the ESPN application) is credited with a duration of presentation 969 of fifteen minutes and thirty-nine seconds. In the illustrated example, if it takes more than a threshold amount of time from the time that a first HTTP request was received from the first application to the time that a request was received from another application, it is assumed that the user left the first application and is no longer interacting with the first application. To account for this, the last known time (e.g., the second time) that the application was active is used to calculate the presentation duration. If the difference between the third time and the first time is not greater than the threshold (block 945), the example duration calculator 155 credits the first application with a duration equal to the difference between the third time and the first time (block 955). With respect to the illustrated example of 9B, the difference between the first time (record 971) and the third time (record 974) is not greater than the threshold. Accordingly, the application associated with the first record 971 is credited with a duration of presentation 975 of four minutes and forty-two seconds.

In examples disclosed herein, the example duration calculator 155 processes each record to determine a presentation duration associated with the application of the record/HTTP request. In the illustrated example, the example duration calculator 155 only processes records that are resolved to a particular application (e.g., "app resolved"). However, in some examples, the duration calculator 155 determines a presentation duration for unknown applications. In some examples, the unknown application is assigned a minimal unknown presentation duration of one second. The minimal unknown presentation duration ensures that the reporter 160 is able to identify records that were not application resolved and/or to call out non-generic user agents that have not yet been identified. In some other examples, applications using non-generic user agents (e.g., unidentified applications) are credited as unknown application specific user agents. An identity of these non-generic user agents can be determined at a later time (e.g., manually).

In some examples, application resolved records may be associated with an App Store application (e.g., Apple iTunes, Google Play, etc.). In some examples, the App Store application is invoked within another application to, for example, enable a user to purchase another application (e.g., some free applications allow a user to purchase a full version of the application), enable user to purchase application features and/or items (e.g., within a game). In some examples, these App Store application records do not indicate that the user left the application invoking the App Store but, rather indicate that App Store information was requested by the application. In some examples, if records that are application resolved to the App Store application are observed within a threshold time period from records that are application resolved to the App Store application, the App Store application records may be ignored. In the illustrated example of FIG. 9B, the app store record 973 is ignored as it likely represents in-application offerings made by the ESPN application.

Figure 9E:
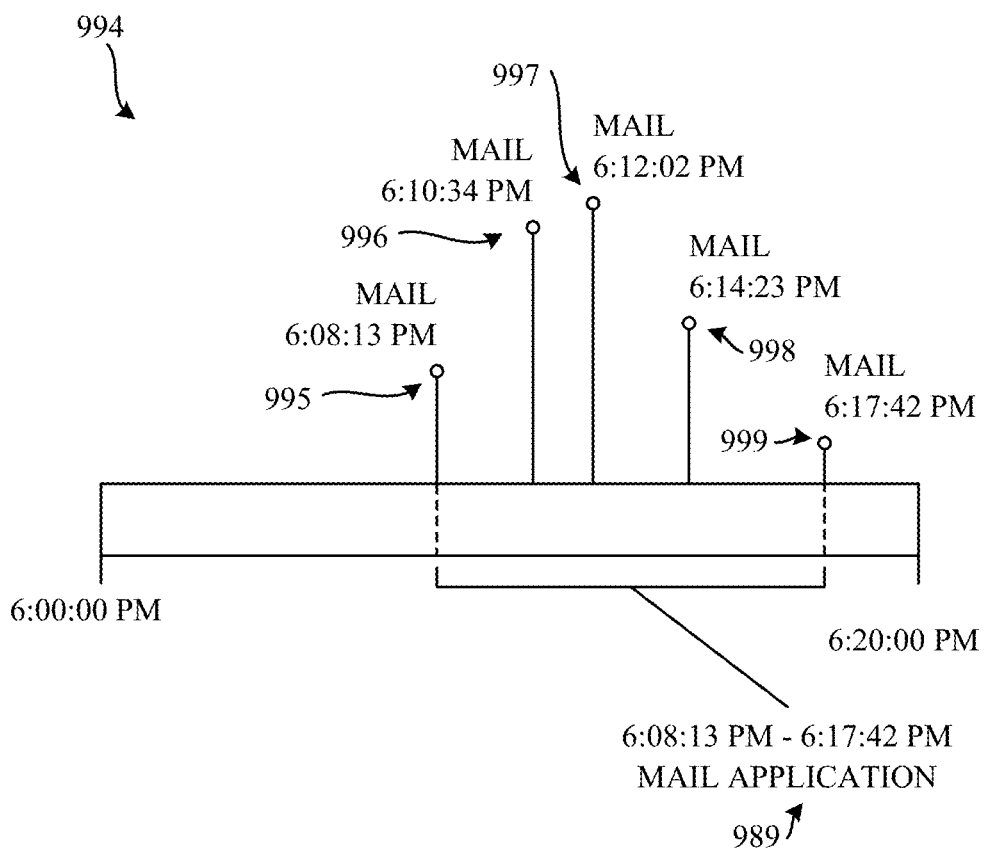

As described above, records that are associated with e-mail applications are filtered out by the request filter 145. However, in some examples, the request may not be filtered and, instead, may be tagged as being associated with an e-mail application. FIG. 9E illustrates an example timeline 994 where multiple e-mail application records 995, 996, 997, 998, 999 that would otherwise be ignored are credited with a presentation duration 989. In some examples, monitoring entities are interested to understand how users interact with e-mail applications on a mobile device. Ignoring and/or filtering records that are associated with the e-mail application may prevent such an analysis. Accordingly, in some examples, the e-mail application records are identified such that the e-mail application may be credited with a presentation duration. However, besides being displayed, the e-mail application may transmit requests in the background of the device and, accordingly, may interfere with application crediting. Accordingly, the example duration calculator 155 of the illustrated example identifies e-mail application records only when a threshold number of records are consecutively included in the request log. In the illustrated example, the threshold number of consecutive records is five. However, any other threshold number may additionally or alternatively be used. The presence of the threshold number of records indicate the user is actively using the e-mail application, and a duration of the e-mail application may be calculated by the duration calculator 155.

While the examples disclosed herein are described with respect to crediting an application executed by the mobile device 105, any other type of crediting may additionally and or alternatively occur. For example, the duration calculator 155 may credit different URLs (e.g., websites) based on the HTTP records. For example, browser applications such as a browser application 215 of the illustrated example FIG. 2 are typically used to request websites from a wide range of domains. While crediting the browser applications 215 is important, it may also be important to understand which websites the user visited while using a browser application 215. Accordingly the duration calculator 155 may credit different domains (e.g., websites) based on the HTTP records received via the proxy 115.

FIG. 10 illustrates an example report 1000 that may be created by the example reporter 160 of FIG. 1. The example report 1000 illustrates usage statistics of different types of applications across age demographics. In the illustrated example, the report 1000 shows usage durations of streaming media applications 1002, social media applications 1004, and news reader applications 1006 for users ages sixteen to twenty-four 1020, ages twenty-five to forty 1022, and ages forty-one to sixty-five 1024. While in the illustrated example, the example report 1000 is based on application type and age, any other factors may additionally or alternatively be used such as, for example, race, geographic location, income, etc. In the illustrated example, the example report 1000 shows average usage durations over a period of one day. That is, durations of individual application sessions are aggregated by the reporter 160 and reported as a total time of use. However, any other duration and/or statistic may additionally or alternatively be used such as, for example, a number of times an application was opened, an average duration of an individual session of an application, etc.

Figure 11:
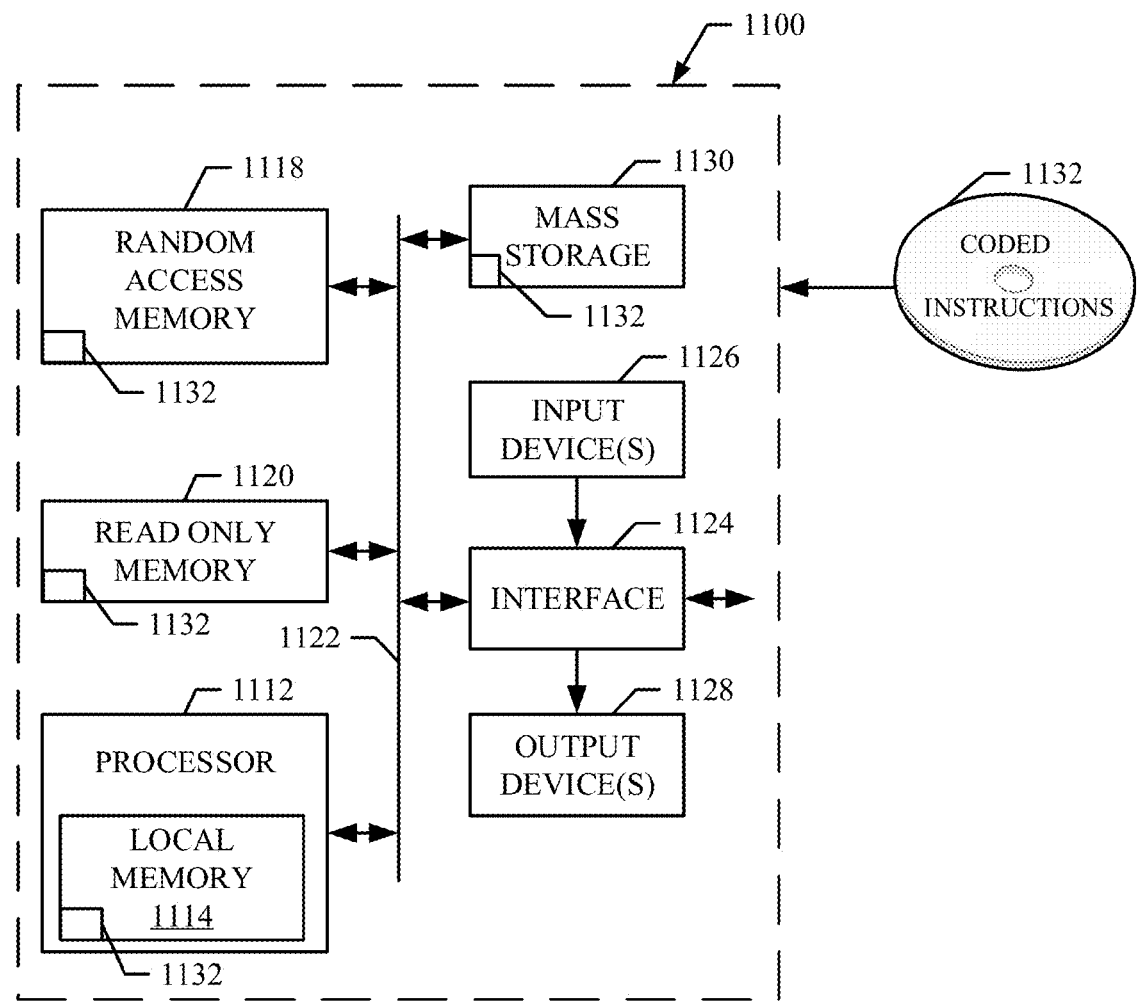
FIG. 11 is a block diagram of an example processor platform capable of executing the instructions of FIGS. 5, 6, 7, 8, and/or 9 to implement the example monitoring system of FIG. 1.

FIG. 11 is a block diagram of an example processor platform 1100 capable of executing the instructions of FIGS. 5, 6, 7, 8, and/or 9 to implement the example monitoring system 100 of FIG. 1. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIGS. 5, 6, 7, 8, and/or 9 may be stored in the mass storage device 1128, in the volatile memory 1114, in the non-volatile memory 1116, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method for monitoring Internet usage, the method comprising:
    identifying, with a processor, a first application associated with a first request received at a proxy;
    identifying, with the processor, a second request associated with a same application as the first request;
    identifying, with the processor, a third request at a time after the second request;
    determining, with the processor, a first time difference between the first request and the third request;
    crediting, with the processor, the first application with a first presentation duration equal to the first time difference when the first time difference is less than a threshold time; and
    crediting, with the processor, the first application with a second presentation duration equal to a second time difference between the first request and the second request when the first time difference is at least one of greater than or equal to the threshold time.

2. The method as described in claim 1, further including identifying a panelist associated with the first request.

3. The method as described in claim 1, further including identifying a device associated with the first request.

4. The method as described in claim 1, wherein the first request is a hypertext transfer protocol (HTTP) request.

5. The method as described in claim 1, wherein the identification of the first application is based on a user agent of the first request.

6. The method as described in claim 5, wherein the user agent explicitly identifies the first application.

7. The method as described in claim 5, wherein the user agent impliedly identifies the first application.

8. The method as described in claim 1, wherein the identification of the first application is based on a universal resource locator of the first request when a user agent of the first request is generic.

9. The method as described in claim 8, wherein the first application is identified based on a lookup using the universal resource locator and the generic user agent.

10. The method as described in claim 1, wherein the identification of the first application is based on a second application identified in association with a fourth request received at the proxy, the fourth request having a same user agent as the first request and occurring within a time window of the first request.

11. The method as described in claim 10, wherein the time window is prior to the time of the first request.

12. The method as described in claim 1, wherein the first and second requests are first and last consecutive records associated with the same application.

13. The method as described in claim 1, further including crediting the first application with a minimal presentation duration when the second presentation duration is zero.

14. A tangible machine-readable storage medium comprising instructions which, when executed, cause a machine to at least:
    identify a first application associated with a first request received at a proxy;
    identify a second request associated with a same application as the first request;
    identify a third request at a time after the second request;
    determine a first time difference between the first request and the third request;
    credit the first application with a first presentation duration equal to the first time difference when the first time difference is less than a threshold time; and
    credit the first application with a second presentation duration equal to a second time difference between the first request and the second request when the first time difference is at least one of greater than or equal to the threshold time.

15. The machine-readable storage medium as described in claim 14, wherein the instructions, when executed, cause the machine to identify a panelist associated with the first request.

16. The machine-readable storage medium as described in claim 14, wherein the instructions, when executed, cause the machine to identify a device associated with the first request.

17. The machine-readable storage medium as described in claim 14, wherein the first request is a hypertext transfer protocol (HTTP) request.

18. The machine-readable storage medium as described in claim 14, wherein the instructions cause the machine to identify the first application based on a user agent of the first request.

19. The machine-readable storage medium as described in claim 18, wherein the user agent explicitly identifies the first application.

20. The machine-readable storage medium as described in claim 18, wherein the user agent impliedly identifies the first application.

21. The machine-readable storage medium as described in claim 14, wherein the instructions cause the machine to identify the first application based on a universal resource locator of the first request when a user agent of the first request is generic.

22. The machine-readable storage medium as described in claim 21, wherein the instructions cause the machine to identify the first application based on a lookup using the universal resource locator and the generic user agent.

23. The machine-readable storage medium as described in claim 14, wherein the instructions cause the machine to identify the first application is based on a second application identified in association with a fourth request received at the proxy, the fourth request having a same user agent as the first request and occurring within a time window of the first request.

24. The machine-readable storage medium as described in claim 23, wherein the time window is prior to the time of the first request.

25. The machine-readable storage medium as described in claim 14, wherein the first and second requests are first and last consecutive records associated with the same application.

26. The machine-readable storage medium as described in claim 14, wherein the instructions, when executed, cause the machine to credit the first application with a minimal presentation duration when the second presentation duration is zero.

27. An apparatus to monitor Internet usage, the apparatus comprising:
- an application identifier to identify a first application associated with a first request received at a proxy server, to identify a second request associated with a same application as the first request, and to identify a third request at a time after the second request; and
- a duration calculator to credit the first application with a first presentation duration equal to a first time difference between the first request and the third request when the first time difference is less than a threshold time, and to credit the first application with a second presentation duration equal to a second time difference between the first request and the second request when the first time difference is at least one of greater than or equal to the threshold time.

28. The apparatus as described in claim 27, further including a request filter to filter requests received by the proxy server to prevent the filtered requests from being processed by the application identifier and the duration calculator.

29. The apparatus as described in claim 27, further including a user identifier to identify a user associated with the first request.

30. The apparatus as described in claim 27, further including comprising a device identifier to identify a device associated with the first request.

31. The apparatus as described in claim 27, wherein the first request is a hypertext transfer protocol (HTTP) request.

32. The apparatus as described in claim 27, wherein the application identifier is to identify the first application based on a user agent of the first request.

33. The apparatus as described in claim 32, wherein the user agent explicitly identifies the first application.

34. The apparatus as described in claim 32, wherein the user agent impliedly identifies the first application.

35. The apparatus as described in claim 27, wherein the application identifier is to identify the first application based on a universal resource locator of the first request when a user agent of the first request is generic.

36. The apparatus as described in claim 35, wherein the application identifier is to identify the first application based on a lookup using the universal resource locator and the generic user agent.

37. The apparatus as described in claim 27, wherein the application identifier is to identify the first application based on a second application identified in association with a fourth request received at the proxy server, the fourth request having a same user agent as the first request and occurring within a time window of the first request.

38. The apparatus as described in claim 37, wherein the time window is prior to the time of the first request.

39. The apparatus as described in claim 27, wherein the first and second requests are first and last consecutive records associated with the same application.

40. The apparatus as described in claim 27, wherein the duration calculator is to credit the first application with a minimal presentation duration when the second presentation duration is zero.

* * * * *